US012265263B2

(12) United States Patent
Fini et al.

(10) Patent No.: US 12,265,263 B2
(45) Date of Patent: Apr. 1, 2025

(54) DUAL-POLARIZATION GRATING COUPLER

(71) Applicant: Ayar Labs, Inc., Santa Clara, CA (US)

(72) Inventors: John Fini, Albany, CA (US); Uma Krishnamoorthy, Santa Clara, CA (US)

(73) Assignee: Ayar Labs, Inc., San Jose, CA (US)

( * ) Notice: Subject to any disclaimer, the term of this patent is extended or adjusted under 35 U.S.C. 154(b) by 33 days.

(21) Appl. No.: 17/567,020

(22) Filed: Dec. 31, 2021

(65) Prior Publication Data

US 2022/0214502 A1 Jul. 7, 2022

Related U.S. Application Data

(60) Provisional application No. 63/133,416, filed on Jan. 4, 2021.

(51) Int. Cl.
*G02B 6/34* (2006.01)
*G02B 6/27* (2006.01)

(52) U.S. Cl.
CPC ............. *G02B 6/34* (2013.01); *G02B 6/2726* (2013.01)

(58) Field of Classification Search
CPC .... G02B 6/34; G02B 6/2726; G02B 6/12002; G02B 6/124; G02B 6/30
See application file for complete search history.

(56) References Cited

U.S. PATENT DOCUMENTS

| | | | | |
|---|---|---|---|---|
| 9,529,156 | B2 * | 12/2016 | Vermeulen | G02B 6/124 |
| 9,625,717 | B2 * | 4/2017 | Sunnari | G02B 6/0026 |
| 10,001,601 | B2 * | 6/2018 | Wohlfeil | G02B 6/124 |
| 10,459,133 | B1 * | 10/2019 | Liang | G02B 6/12004 |

OTHER PUBLICATIONS

International Application No. PCT/US2021/065846, International Search Report and Written Opinion of the International Searching Authority, Mar. 28, 2022.
Wade, Mark T. et al., "75% Efficient Wide Bandwidth Grating Couplers in a 45 nm Microelectronics CMOS Process," 2015 IEEE Optical Interconnects Conference (OI), San Diego, California, Apr. 20, 2015, pp. 46-47.
Notaros, Jelena et al., "Ultra-Efficient CMOS Fiber-to-Chip Grating Couplers," 2016 Optical Fiber Communications Conference and Exhibition (OFC), Anaheim, California, Mar. 20, 2016, pp. 1-3.
Gopinath, Juliet T. et al., "High-Brightness Wavelength-Beam-Combined Eyesafe Diode Laser Stacks," 2007 Conference on Lasers and Electro-Optics (CLEO), Baltimore, Maryland, May 6, 2007, pp. 1-2.

* cited by examiner

*Primary Examiner* — Michael P Mooney
(74) *Attorney, Agent, or Firm* — Penilla IP, APC

(57) ABSTRACT

An optical grating coupler includes a primary layer formed of a material having a first refractive index. A first plurality of scattering elements is formed within the primary layer. The first plurality of scattering elements has a second refractive index that is different than the first refractive index. A secondary layer is formed over the primary layer. The secondary layer is formed of a material having a third refractive index. A second plurality of scattering elements is formed within the secondary layer. The second plurality of scattering elements has a fourth refractive index that is different than the third refractive index. The fourth refractive index is different than the second refractive index. At least some of the second plurality of scattering elements at least partially overlap corresponding ones of the first plurality of scattering elements.

20 Claims, 27 Drawing Sheets

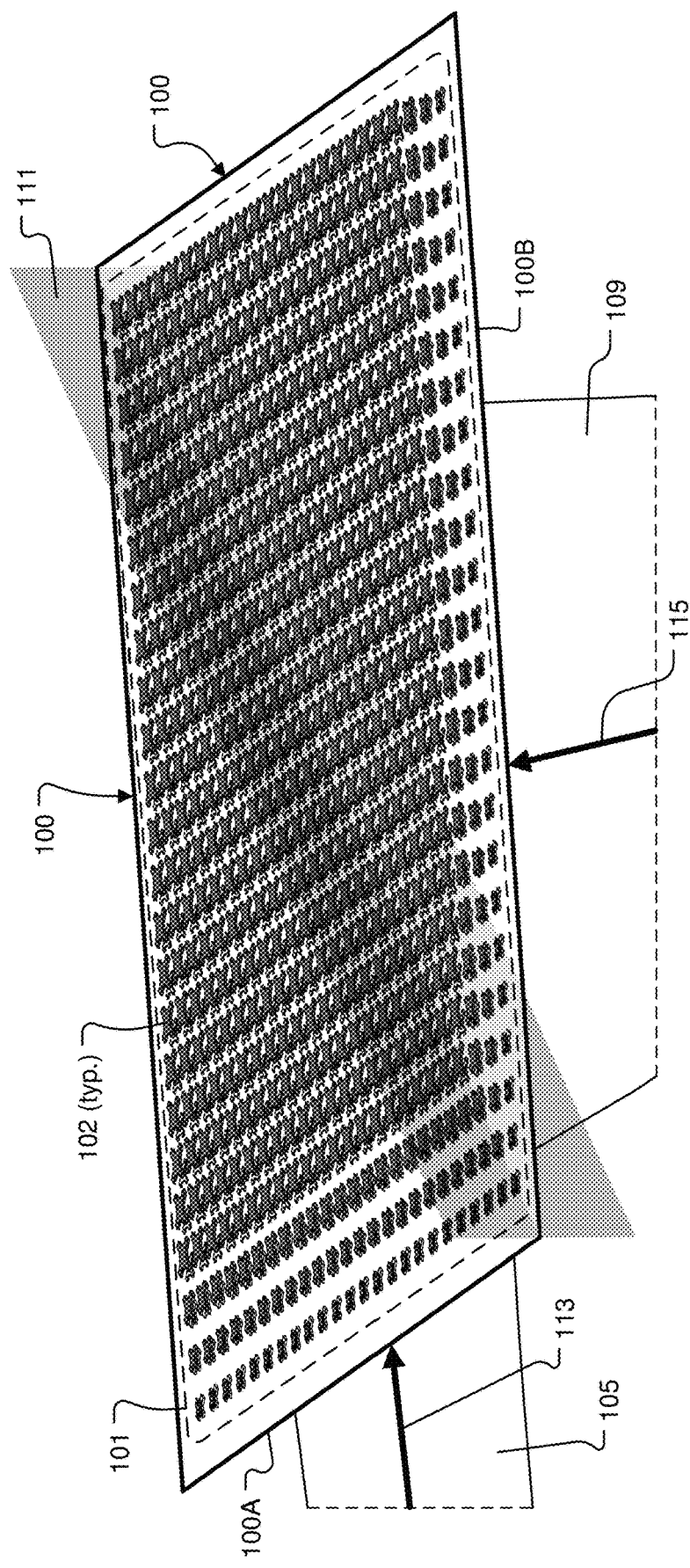

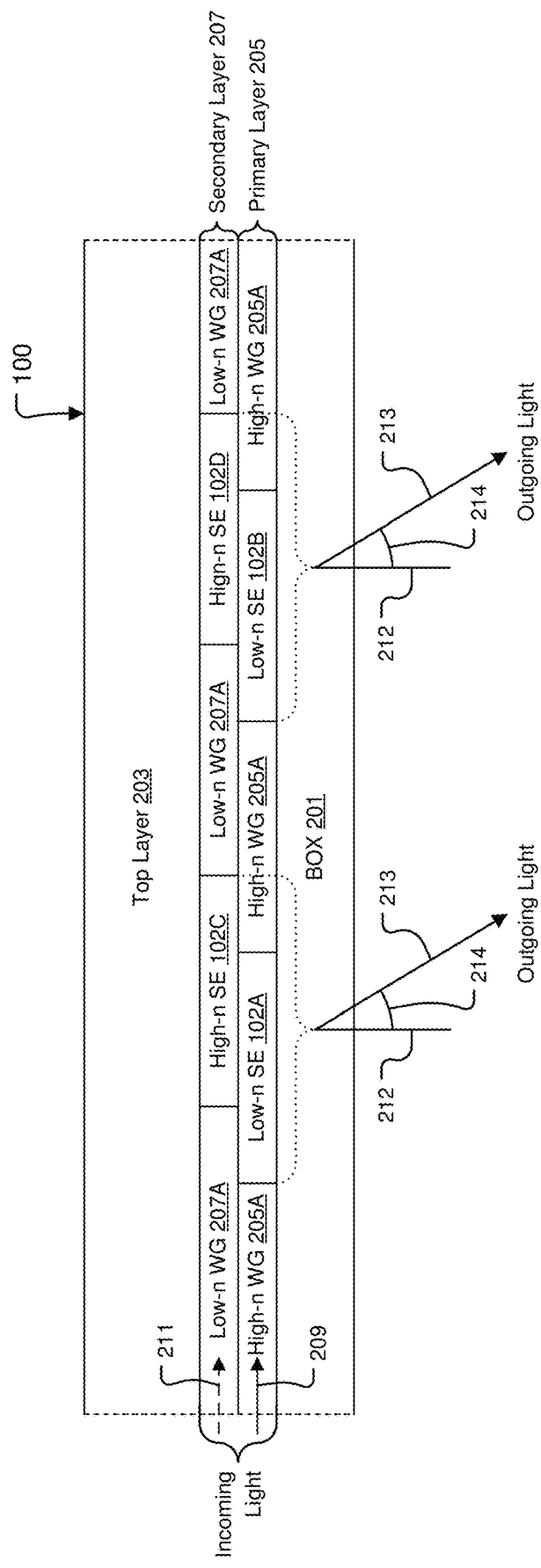

DUAL-POLARIZATION GRATING COUPLER

CLAIM OF PRIORITY

This application claims priority under 35 U.S.C. 119(e) to U.S. Provisional Patent Application No. 63/133,416, filed on Jan. 4, 2021, the disclosure of which is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated light is transmitted through an optical data network from a sending node to a receiving node. The modulated light having arrived at the receiving node is de-modulated to obtain the original digital data patterns. Therefore, implementation and operation of optical data communication systems is dependent upon having reliable and efficient mechanisms for transmitting light and detecting light at different nodes within the optical data network. It is within this context that the present invention arises.

SUMMARY

In an example embodiment, an optical grating coupler is disclosed. The optical grating coupler includes a primary layer formed of a material having a first refractive index. The optical grating coupler also includes a first plurality of scattering elements formed within the primary layer. The first plurality of scattering elements has a second refractive index that is different than the first refractive index. The optical grating coupler also includes a secondary layer formed over the primary layer. The secondary layer is formed of a material having a third refractive index. The optical grating coupler also includes a second plurality of scattering elements formed within the secondary layer. The second plurality of scattering elements has a fourth refractive index that is different than the third refractive index. The fourth refractive index is different than the second refractive index. At least some of the second plurality of scattering elements at least partially overlap corresponding ones of the first plurality of scattering elements.

In an example embodiment, a method is disclosed for combining light beams. The method includes having an optical grating coupler that includes a primary layer and a secondary layer. The primary layer includes a first plurality of scattering elements. The secondary layer includes a second plurality of scattering elements. At least some of the second plurality of scattering elements at least partially overlap corresponding ones of the first plurality of scattering elements. The method also includes directing a first beam of light into a first lateral side of the optical grating coupler. The method also includes directing a second beam of light into a second lateral side of the optical grating coupler. The second lateral side is adjacent to the first lateral side along a perimeter of the optical grating coupler. The first plurality of scattering elements and the second plurality of scattering elements collectively scatter both the first beam of light and the second beam of light into a third beam of light.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 1B shows a perspective view of the vertical grating coupler, in accordance with some embodiments.

FIG. 2A shows a vertical cross-section through a portion of the vertical grating coupler within the plane of symmetry, in accordance with some embodiments.

DETAILED DESCRIPTION

Figure 1A:
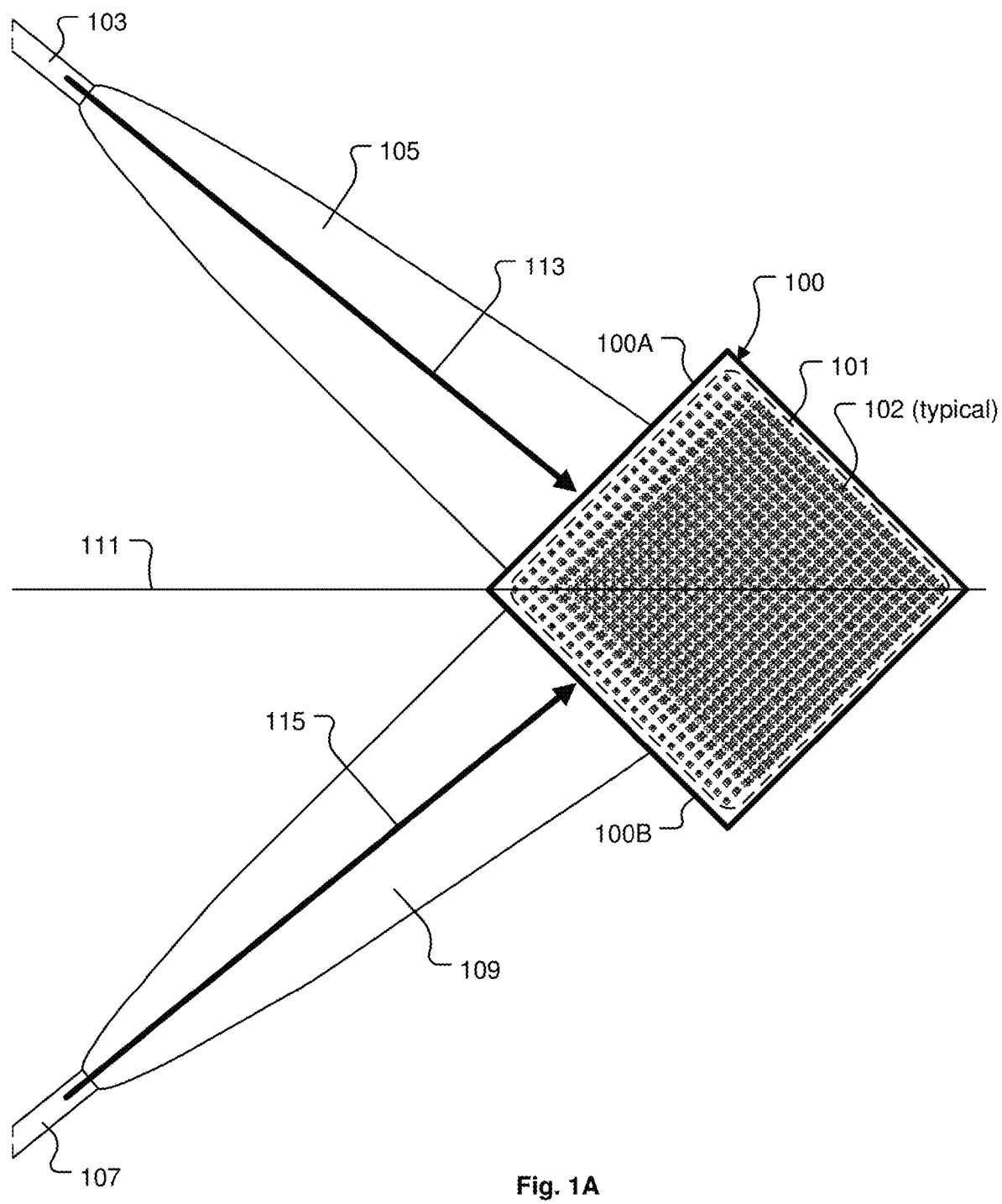
FIG. 1A shows a top view of a vertical grating coupler, in accordance with some embodiments.

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

Embodiments are disclosed herein for a vertical grating coupler that is configured to polarization-multiplex light from two on-chip optical waveguides into two polarizations of an off-chip beam of light. The vertical grating coupler embodiments disclosed herein are compatible with scalable silicon manufacturing processes, such as complementary metal oxide semiconductor (CMOS) manufacturing processes. The various vertical grating coupler embodiments disclosed herein include at least a first array of light scattering elements within a first layer and a second array of light scattering elements within a second layer located either above or below the first layer. In some embodiments, incoming light from the two on-chip optical waveguides interacts with the first array of light scattering elements within the first layer and the second array of light scattering elements within the second layer so as to be directed into the off-chip beam of light. In this manner, when light of a first polarization (TE or TM) is directed through the first on-chip optical waveguide into the vertical grating coupler and light of a second polarization (TE or TM) (different than the first polarization) is directed through the second on-chip optical waveguide into the vertical grating coupler, both the light of the first polarization and the light of the second polarization is scattered (turned) by the vertical grating coupler into the off-chip beam of light.

In various embodiments, the first and second layers that include the first and second arrays of light scattering elements, respectively, are independently patternable with respect to each other. In some embodiments, the first and second layers of the vertical grating coupler are formed as respective patterned silicon layers. In some embodiments, the first array of light scattering elements is formed of a material that has a lower refractive index relative to a material of the first layer within which the first array of light scattering elements is formed. And, the second array of light scattering elements is formed of a material that has a higher refractive index relative to a material of the second layer within which the second array of light scattering elements is formed. In some embodiments, the first array of light scattering elements is formed of a material that has a higher refractive index relative to a material of the first layer within which the first array of light scattering elements is formed. And, the second array of light scattering elements is formed of a material that has a lower refractive index relative to a material of the second layer within which the second array of light scattering elements is formed.

The various vertical grating coupler embodiments disclosed herein combine three features. A first feature of the vertical grating coupler embodiments is that light scattering elements in different layers are laterally offset with respect to each other in order to provide high directionality to the scattered light. A second feature of the vertical grating coupler embodiments is that light scattering elements in each of the layers are positioned in accordance with a regular array (or grid) that satisfies a phase-matching condition for scattering light from each of the two input optical waveguides into the off-chip beam of light. In some embodiments, a centerpoint of each of the scattering elements within a given layer is positioned at a gridpoint of a regular array (or grid) defined for the given layer to satisfy the phase-matching condition for scattering incoming light from each of the two input optical waveguides into the off-chip beam of light. A third feature of the various vertical grating coupler embodiments is that the light scattering elements within a given layer have apodized scattering strength as a function of position relative to the two input optical waveguides. Also, respective input optical waveguide tapers are provided to transition from the two input optical waveguides to the vertical grating coupler in order to produce a flat phase front of the light as it enters the vertical grating coupler. In some embodiments, the input optical waveguide tapers are configured as adiabatic tapers.

Figure 1C:
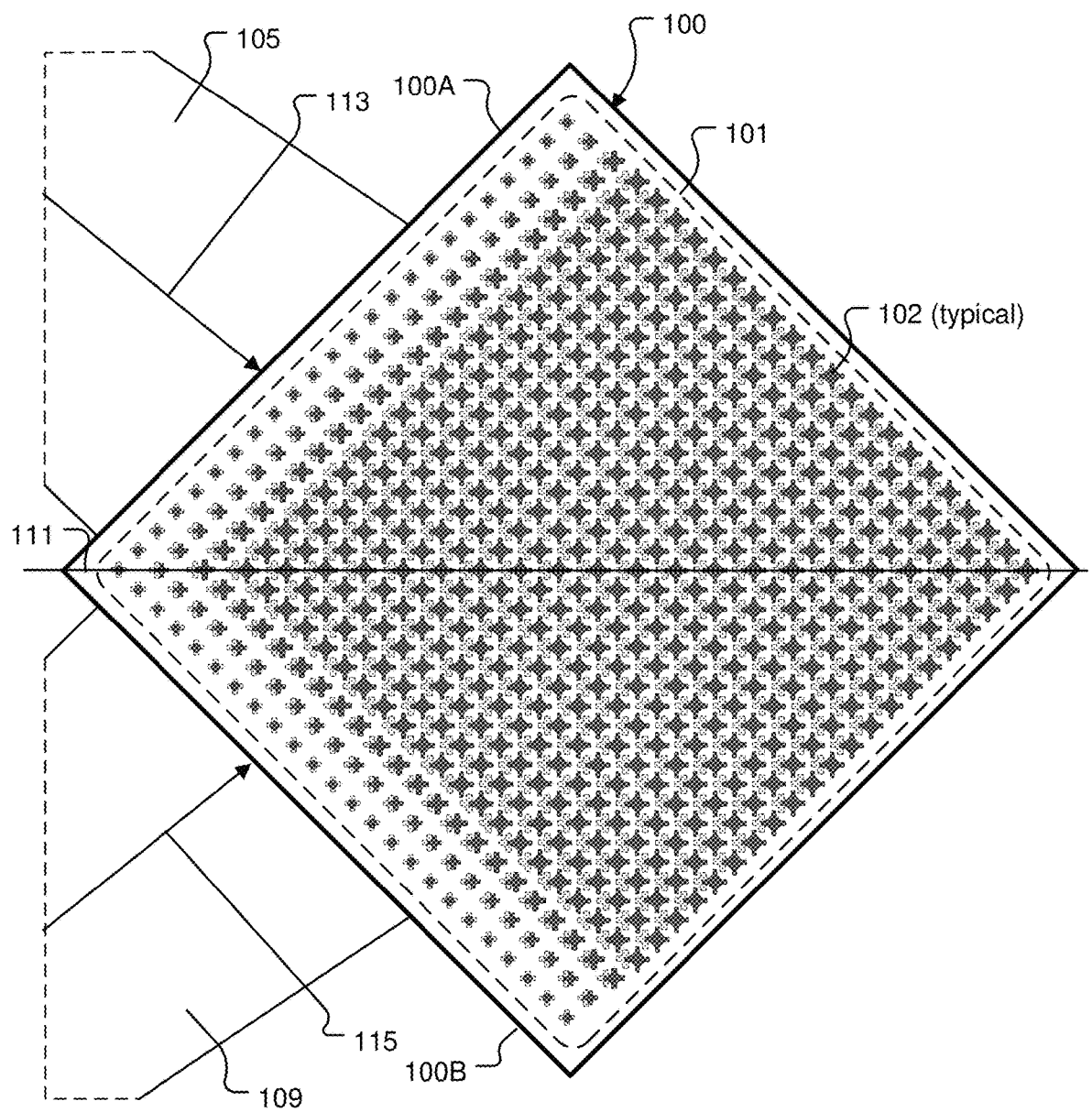
FIG. 1C shows a close-up view of the top of the vertical grating coupler, in accordance with some embodiments.

FIG. 1A shows a top view of a vertical grating coupler 100, in accordance with some embodiments. FIG. 1B shows a perspective view of the vertical grating coupler 100, in accordance with some embodiments. FIG. 1C shows a close-up view of the top of the vertical grating coupler 100, in accordance with some embodiments. The vertical grating coupler 100 includes a region of light scattering elements 102, as shown within the dashed line 101. There are different types of light scattering elements 102 in multiple layers of the vertical grating coupler 100. Therefore, the reference numeral 102 (typical) is used to refer to scattering elements in general. In some embodiments, the scattering elements 102 are positioned with respect to a regular arrays (or grid) within the two separate layers. A first optical waveguide 103 and a first optical waveguide taper 105 are provided to direct light into the vertical grating coupler 100, as indicated by arrow 113. A second optical waveguide 107 and a second optical waveguide taper 109 are also provided to direct light into the vertical grating coupler 100, as indicated by arrow 115. In some embodiments, the first optical waveguide taper 105 is connected (optically coupled) to a first lateral side 100A of the vertical grating coupler 100, and the second optical waveguide taper 109 is connected (optically coupled) to a second lateral side 100B of the vertical grating coupler 100, where the first lateral side 100A and the second lateral side 100B of the vertical grating coupler 100 are adjacent to each other along the perimeter of the vertical grating coupler 100. In some embodiments, the first optical waveguide taper 105 and the second optical waveguide taper 109 are positioned and oriented in a substantially symmetric manner relative to a plane of symmetry 111 that extends vertically through the center of the vertical grating coupler 100 at a location between the first optical waveguide taper 105 and the second optical waveguide taper 109. In some embodiments, light of a first polarization travels through the first optical waveguide 103, through the first optical waveguide taper 105, and into the vertical grating coupler 100, as indicated by arrow 113. And, light of a second polarization travels through the second optical waveguide 107, through the second optical waveguide taper 109, and into the vertical grating coupler 100, as indicated by arrow 115. In this manner, in some embodiments, the first optical waveguide taper 105 and the second optical waveguide taper 109 couple light of two polarizations, respectively, into the vertical grating coupler 100, with the vertical grating coupler 100 functioning to redirect the light of the two polarizations into the off-chip beam of light.

FIG. 2A shows a vertical cross-section through a portion of the vertical grating coupler 100 within the plane of symmetry 111, in accordance with some embodiments. In the example embodiment of FIG. 2A, the vertical grating coupler 100 includes a primary layer 205 formed on a buried oxide (BOX) layer 201, and a secondary layer 207 formed above the primary layer 205. A top layer 203 is formed over the secondary layer 207. In some embodiments, the BOX layer 201 is formed of silicon dioxide. However, it should be understood that in various embodiments the BOX layer 201 can be formed of essentially any material used to formed a BOX layer in silicon-on-insulator (SOI) semiconductor device design and fabrication. In some embodiments, the top layer 203 is formed of an oxide material, such as silicon dioxide. However, it should be understood that in various embodiments the top layer 203 can be formed of essentially any type of dielectric material used in back-end-of-line (BEOL) semiconductor device design and fabrication.

In the example configuration of FIG. 2A, the primary layer 205 is formed of a high refractive index (high-n) optical waveguide material 205A, such as crystalline silicon (refractive index of about 3.97) or other similar material. The primary layer 205 includes low refractive index (low-n) scattering elements 102A, 102B, etc., formed/disposed within the optical waveguide material 205A. In some embodiments, the primary layer 205 is formed by depositing/forming a continuous layer of the high refractive index optical waveguide material 205A on the BOX layer 201, followed by etching of cavities/holes into/through the optical waveguide material 205A (where the cavities/holes correspond to shapes and sizes of the scattering elements 102A, 102B, etc.), followed by depositing low refractive index material within the cavities/holes within the optical waveguide material 205A to form the low refractive index scattering elements 102A, 102B, etc. In some embodiments, a planarization process (etch planarization, plasma-based planarization, and/or chemical mechanical planarization (CMP)) is performed on the primary layer 205 to obtain high level of planarity across the top surface of the primary layer 205 prior to formation of the secondary layer 207. In this manner, the high refractive index optical waveguide material 205A forms a field of the primary layer 205, with the low refractive index scattering elements distributed throughout the field of the primary layer 205.

In the example configuration of FIG. 2A, the secondary layer 207 is formed of a low refractive index (low-n) field material 207A, such as silicon nitride (refractive index of about 2.02) or other similar material. The secondary layer 207 includes high refractive index (high-n) scattering elements 102C, 102D, etc., formed/disposed within the field material 207A. In some embodiments, the secondary layer 207 is formed by depositing/forming a continuous layer of the low refractive index optical waveguide material 207A on the primary layer 205, followed by etching of holes through the field material 207A (where the holes correspond to shapes and sizes of the scattering elements 102C, 102D, etc.), followed by depositing high refractive index material within the holes within the field material 207A to form the high refractive index scattering elements 102C, 102D, etc. In some embodiments, a planarization process (etch planarization, plasma-based planarization, and/or chemical mechanical planarization (CMP)) is performed on the secondary layer 207 to obtain high level of planarity across the top surface of the secondary layer 207 prior to formation of the top layer 203. In this manner, the high refractive index scattering elements 102C, 102D, etc., are formed and distributed within the low refractive index field material 207A.

In some embodiments, the scattering elements 102 of the primary layer 205 (e.g., the low refractive index scattering elements 102A, 102B, etc.) are formed of an oxide material (such as silicon dioxide or other optically similar oxide material) in a layer otherwise made of silicon (such as crystalline silicon or polycrystalline silicon (polysilicon) or other optically similar material). Also, in some embodiments, the scattering elements 102 of the secondary layer 207 (e.g., the high refractive index scattering elements 102C, 102D, etc.) are formed of a silicon material (such as polycrystalline silicon (polysilicon) or other optically similar material) in a layer otherwise made of lower refractive index material (such as silicon nitride of other optically similar material).

In some embodiments, incoming light that enters the vertical grating coupler 100 (through the first optical waveguide 103 and first optical waveguide taper 105 and/or through the second optical waveguide 107 and second optical waveguide taper 109) is directed into the primary layer 205, as indicated by arrow 209. Also, in some embodiments, incoming light that enters the vertical grating coupler 100 (through the first optical waveguide 103 and first optical waveguide taper 105 and/or through the second optical waveguide 107 and second optical waveguide taper 109) is optionally directed into the secondary layer 207, as indicated by the dashed arrow 211. In some embodiments, the material used to form the first optical waveguide 103, first optical waveguide taper 105, the second optical waveguide 107, and second optical waveguide taper 109 is the same material as the high refractive index optical waveguide material 205A used to form the field of the primary layer 205. For example, in some embodiments, crystalline silicon is used to form the first optical waveguide 103, first optical waveguide taper 105, the second optical waveguide 107, and second optical waveguide taper 109, and is the high refractive index optical waveguide material 205A used to form the field of the primary layer 205 of the vertical grating coupler 100. Also, in some embodiments, incoming light is directed into the secondary layer 207, as indicated by dashed arrow 211, through one or more polysilicon optical waveguides formed in a vertical space corresponding to the secondary layer 207. For example, in some embodiments, polysilicon optical waveguides are formed vertically above crystalline silicon optical waveguides to direct the incoming light that enters the vertical grating coupler 100 into both the primary layer 205 and the secondary layer 207, as indicated by arrows 209 and 211, respectively. However, it should be understood that in some embodiments, the incoming light that enters the vertical grating coupler 100 is directed primarily into the primary layer 205, as indicated by arrow 209, but may not be substantially directed into the secondary layer 207.

The incoming light that enters the vertical grating coupler 100 is scattered by the scattering elements 102A, 102B, etc., within the primary layer 205 and by the scattering elements 102C, 102D, etc., within the secondary layer 207, such that the light that enters the vertical grating coupler 100 is directed out of the vertical grating coupler 100 in a controlled direction as the off-chip beam of light, as indicated by arrows 213. In some embodiments, the first optical waveguide taper 105 and the second optical waveguide taper 109 are formed in a symmetric manner with respect to the vertical plane of symmetry 111. Also, the scattering elements 102A, 102B, etc., within the primary layer 205 are formed in a symmetric manner with respect to the vertical plane of symmetry 111. Also, the scattering elements 102C, 102D, etc., within the secondary layer 207 are formed in a symmetric manner with respect to the vertical plane of symmetry 111. In this manner, the outgoing light that exits the vertical grating coupler 100 in the off-chip beam of light is directed at an angle 214 that falls substantially within the vertical plane of symmetry 111. In various embodiments, the configuration of the scattering elements 102A, 102B, etc., within the primary layer 205 and the configuration of the scattering elements 102C, 102D, etc., within the secondary layer 207 are designed to control the angle 214 of the outgoing light that exits the vertical grating coupler 100 substantially within the vertical plane of symmetry 111, where the angle 214 is controlled relative to a vector 212 normal to the bottom of the chip (normal to the bottom of the BOX layer 201).

In some embodiments, the incoming light that enters the vertical grating coupler 100 through the first optical waveguide taper 105 has a first polarization, and the incoming light that enters the vertical grating coupler 100 through the second optical waveguide taper 109 has a second polarization that is different than the first polarization. In these embodiments, the outgoing light in the off-chip beam of light that exits through the BOX layer 201, as indicated by the arrows 213, includes both light having the first polarization and light having the second polarization. In this manner, the vertical grating coupler 100 functions to polarization-multiplex light from the two on-chip optical waveguides 103 and 107 into two polarizations, respectively, within the off-chip beam of light, as indicated by arrows 213.

Figure 2B:
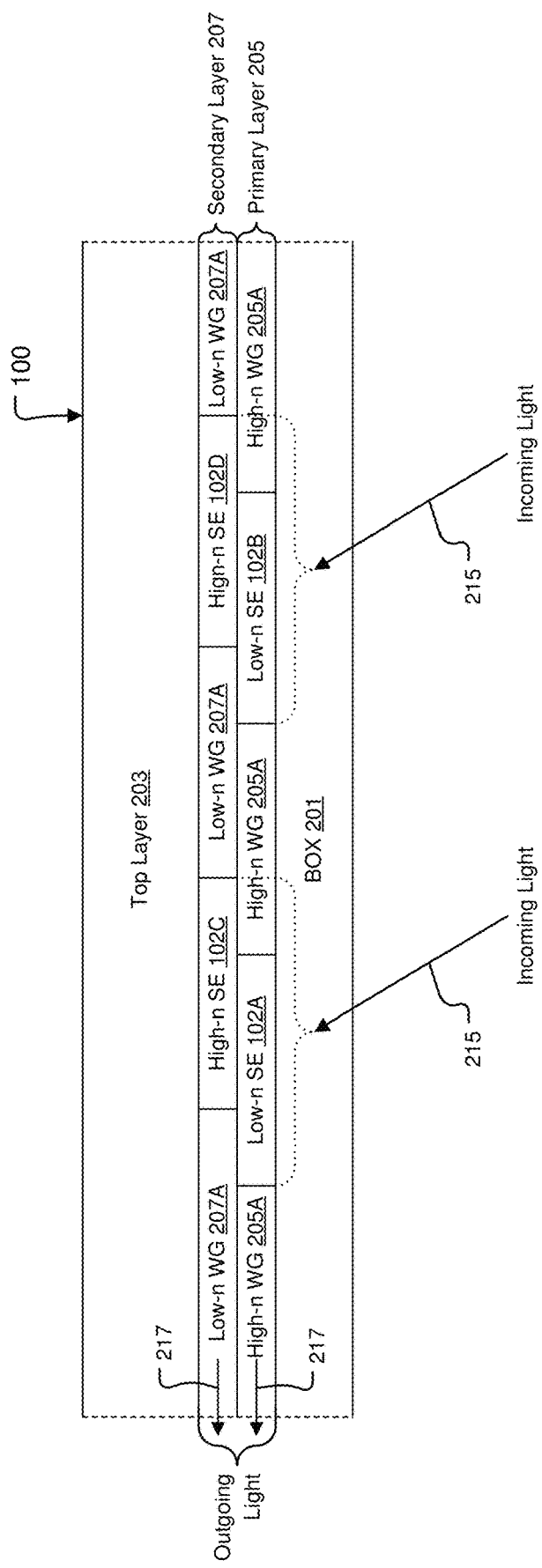
FIG. 2B shows the same configuration of the vertical grating coupler of FIG. 2A with the light propagation directions reversed, in accordance with some embodiments.

It should be understood that the direction of light propagation through the vertical grating coupler 100 is reversable. For example, FIG. 2B shows the same configuration of the vertical grating coupler 100 of FIG. 2A with the light propagation directions reversed, in accordance with some embodiments. In FIG. 2B the incoming light enters the vertical grating coupler through the BOX layer 201, as indicated by arrows 215, and the outgoing light exits the vertical grating coupler 100 at the lateral sides 100A and 100B of the vertical grating coupler 100, as indicated by arrows 217, with a portion of the outgoing light traveling through the first optical waveguide taper 105 and into the optical waveguide 103, and with a portion of the outgoing light traveling through the second optical waveguide taper 109 and into the optical waveguide 107.

Figure 3A:
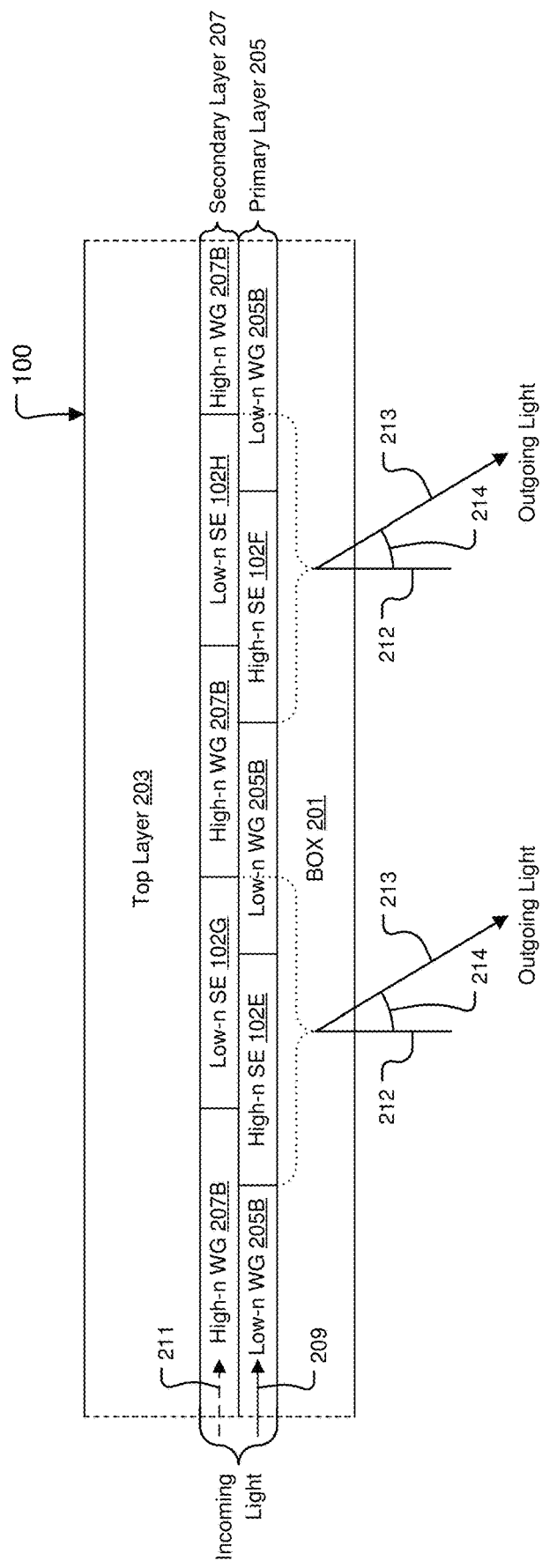
FIG. 3A shows a vertical cross-section through a portion of the vertical grating coupler within the plane of symmetry, in which the refractive indexes of materials is reversed with respect to the configuration of FIGS. 2A and 2B, in accordance with some embodiments.

In some embodiments, the materials used to form the example vertical grating coupler 100 of FIGS. 2A and 2B can be reversed with respect to refractive index. For example, FIG. 3A shows a vertical cross-section through a portion of the vertical grating coupler 100 within the plane of symmetry 111, in which the refractive indexes of materials is reversed with respect to the configuration of FIGS. 2A and 2B, in accordance with some embodiments. In the example configuration of FIG. 3A, the primary layer 205 is formed of a low refractive index (low-n) optical waveguide material 205B, such as silicon nitride (refractive index of about 2.02) or other similar material. The primary layer 205 includes high refractive index (high-n) scattering elements 102E, 102F, etc., such as polysilicon (refractive index of about 3.93) or other similar material, formed/disposed within the optical waveguide material 205B. In some embodiments, the primary layer 205 is formed by depositing/forming a continuous layer of the low refractive index optical waveguide material 205B on the BOX layer 201, followed by etching of cavities/holes into/through the optical waveguide material 205B (where the cavities/holes correspond to shapes and sizes of the scattering elements 102E, 102F, etc.), followed by depositing high refractive index material within the cavities/holes within the optical waveguide material 205B to form the high refractive index scattering elements 102E, 102F, etc. In this manner, the low refractive index optical waveguide material 205B forms a field of the primary layer 205, with the high refractive index scattering elements distributed throughout the field of the primary layer 205.

In the example configuration of FIG. 3A, the secondary layer 207 is formed of a high refractive index (high-n) field material 207B, such as polysilicon or other similar material. The secondary layer 207 includes low refractive index (low-n) scattering elements 102G, 102H, etc., formed/disposed within the field material 207B. In some embodiments, the secondary layer 207 is formed by depositing/forming a continuous layer of the high refractive index optical waveguide material 207B on the primary layer 205, followed by etching of holes through the field material 207B (where the holes correspond to shapes and sizes of the scattering elements 102G, 102H, etc.), followed by depositing low refractive index material within the holes within the field material 207B to form the low refractive index scattering elements 102G, 102H, etc. In this manner, the low refractive index scattering elements 102G, 102H, etc., are formed and distributed within the high refractive index field material 207B.

The incoming light that enters the vertical grating coupler 100 is scattered by the scattering elements 102E, 102F, etc., within the primary layer 205 and by the scattering elements 102G, 102H, etc., within the secondary layer 207, such that the light that enters the vertical grating coupler 100 is directed out of the vertical grating coupler 100 in a controlled direction in the off-chip beam of light, as indicated by arrows 213. In some embodiments, the first optical waveguide taper 105 and the second optical waveguide taper 109 are formed in a symmetric manner with respect to the vertical plane of symmetry 111. Also, the scattering elements 102E, 102F, etc., within the primary layer 205 are formed in a symmetric manner with respect to the vertical plane of symmetry 111. Also, the scattering elements 102G, 102H, etc., within the secondary layer 207 are formed in a symmetric manner with respect to the vertical plane of symmetry 111. In this manner, the outgoing light that exits the vertical grating coupler 100 is directed at the angle 214 that falls substantially within the vertical plane of symmetry 111. In various embodiments, the configuration of the scattering elements 102E, 102F, etc., within the primary layer 205 and the configuration of the scattering elements 102G, 102H, etc., within the secondary layer 207 are designed to control the angle 214 of the outgoing light of the off-chip beam that exits the vertical grating coupler 100 substantially within the vertical plane of symmetry 111.

Figure 3B:
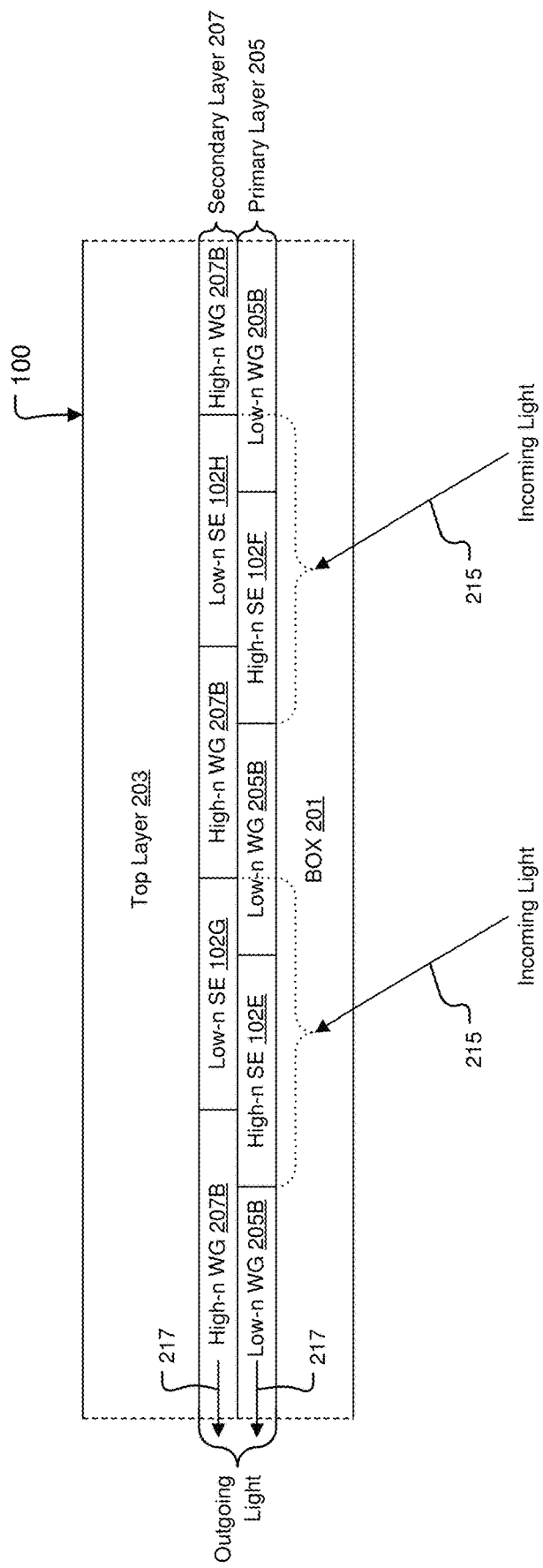
FIG. 3B shows the same configuration of the vertical grating coupler of FIG. 3A with the light propagation directions reversed, in accordance with some embodiments.

As previously mentioned, the direction of light propagation through the vertical grating coupler 100 is reversable. For example, FIG. 3B shows the same configuration of the vertical grating coupler 100 of FIG. 3A with the light propagation directions reversed, in accordance with some embodiments. In FIG. 3B the incoming light enters the vertical grating coupler 100 through the BOX layer 201, as indicated by arrows 215, and the outgoing light exits the vertical grating coupler 100 at the lateral sides 100A and 100B of the vertical grating coupler 100, as indicated by arrow 217, with a portion of the outgoing light traveling through the first optical waveguide taper 105 and into the optical waveguide 103, and with a portion of the outgoing light traveling through the second optical waveguide taper 109 and into the optical waveguide 107.

Figure 4A:
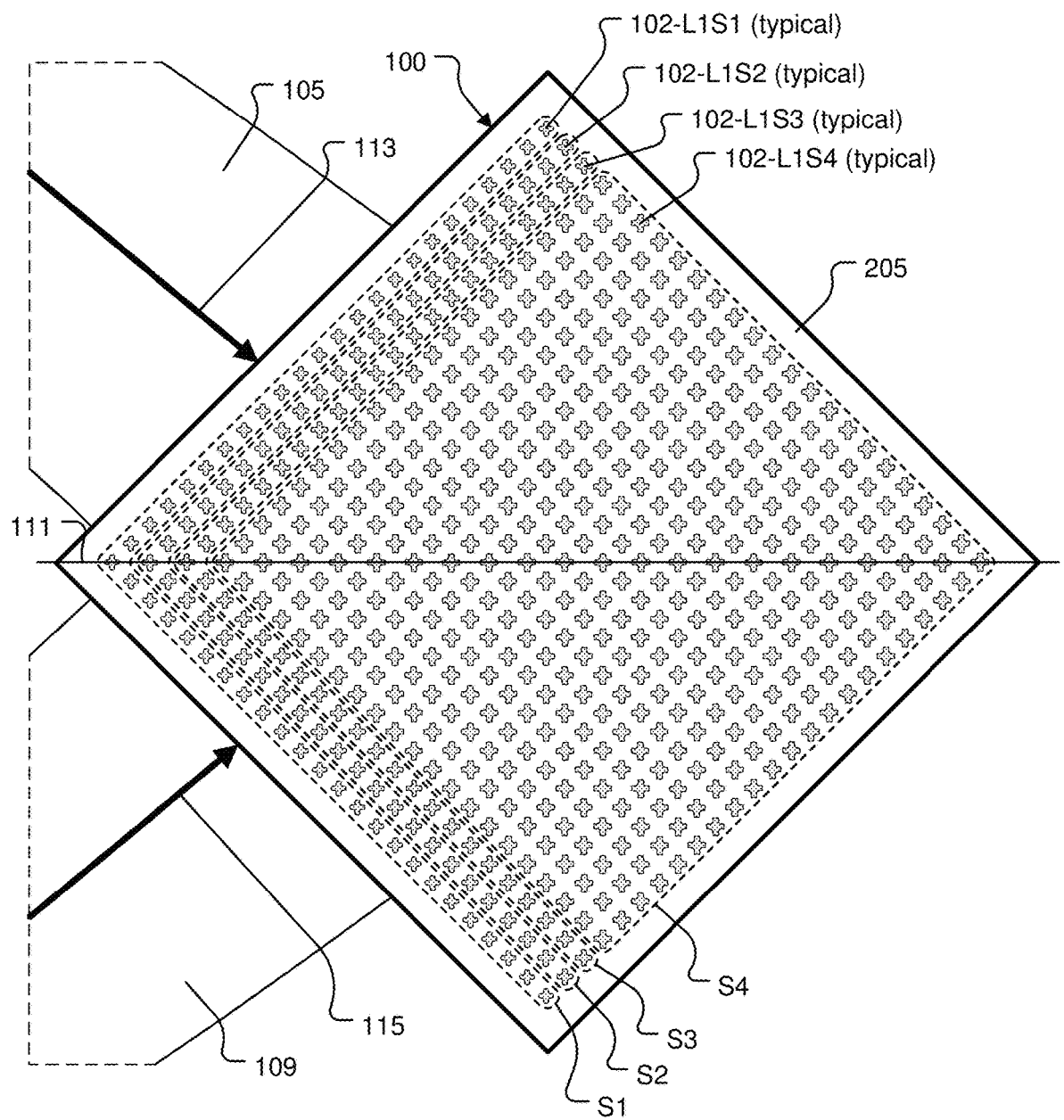
FIG. 4A shows an example configuration of the primary layer, in accordance with some embodiments.
Figure 4B:
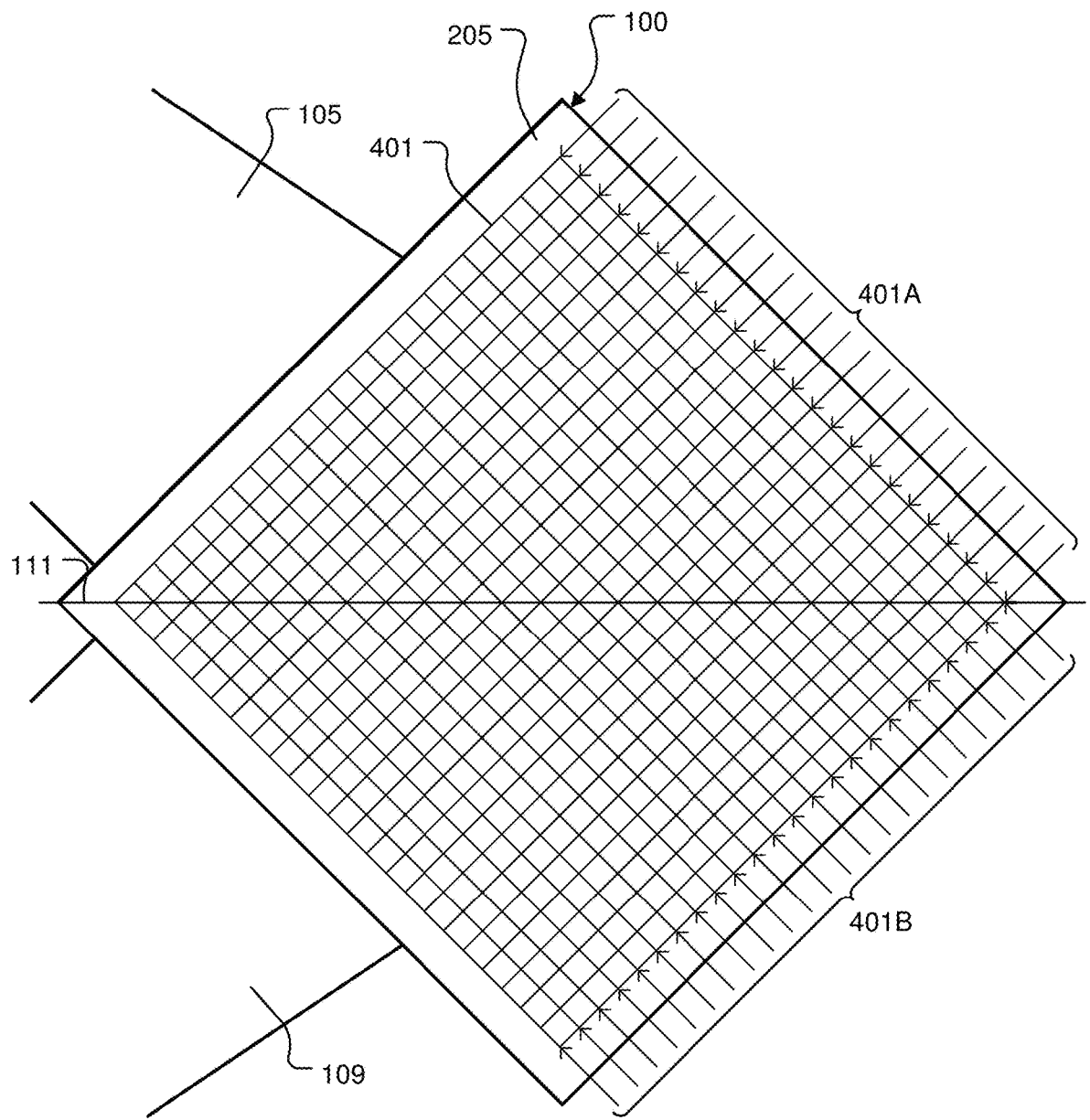
FIG. 4B shows a top view of the grid formed by gridlines, in accordance with some embodiments.

In some embodiments, the scattering elements 102 are formed in two vertical layers of the vertical grating coupler 100. In some embodiments, the scattering elements 102 of the vertical grating coupler 100 are formed in two vertical layers of independently patternable silicon. FIG. 4A shows an example configuration of the primary layer 205, in accordance with some embodiments. Scattering elements 102-L1S1, 102-L1S2, 102-L1S3, and 102-L1S4 are positioned on a grid 401 such as shown in FIG. 4B. FIG. 4B shows a top view of the grid 401 formed by gridlines 401A and 401B, in accordance with some embodiments. The scattering elements 102-L1S1, 102-L1S2, 102-L1S3, and 102-L1S4 are the "+" shapes (cross-shaped structures) shown in FIG. 4A. In some embodiments, a centerpoint (or centroid) of each scattering element 102-L1S1, 102-L1S2, 102-L1S3, and 102-L1S4 is positioned at a corresponding gridpoint of the grid 401, where a given gridpoint of the grid 401 corresponds to a crossing location of any two perpendicularly oriented gridlines 401A and 401B of the grid 401. However, in some embodiments, the centerpoint (or centroid) of one or more of the scattering elements 102-L1S1, 102-L1S2, 102-L1S3, and 102-L1S4 is positioned at a location that is a specified distance and direction from a corresponding gridpoint of the grid 401.

Figure 4C:
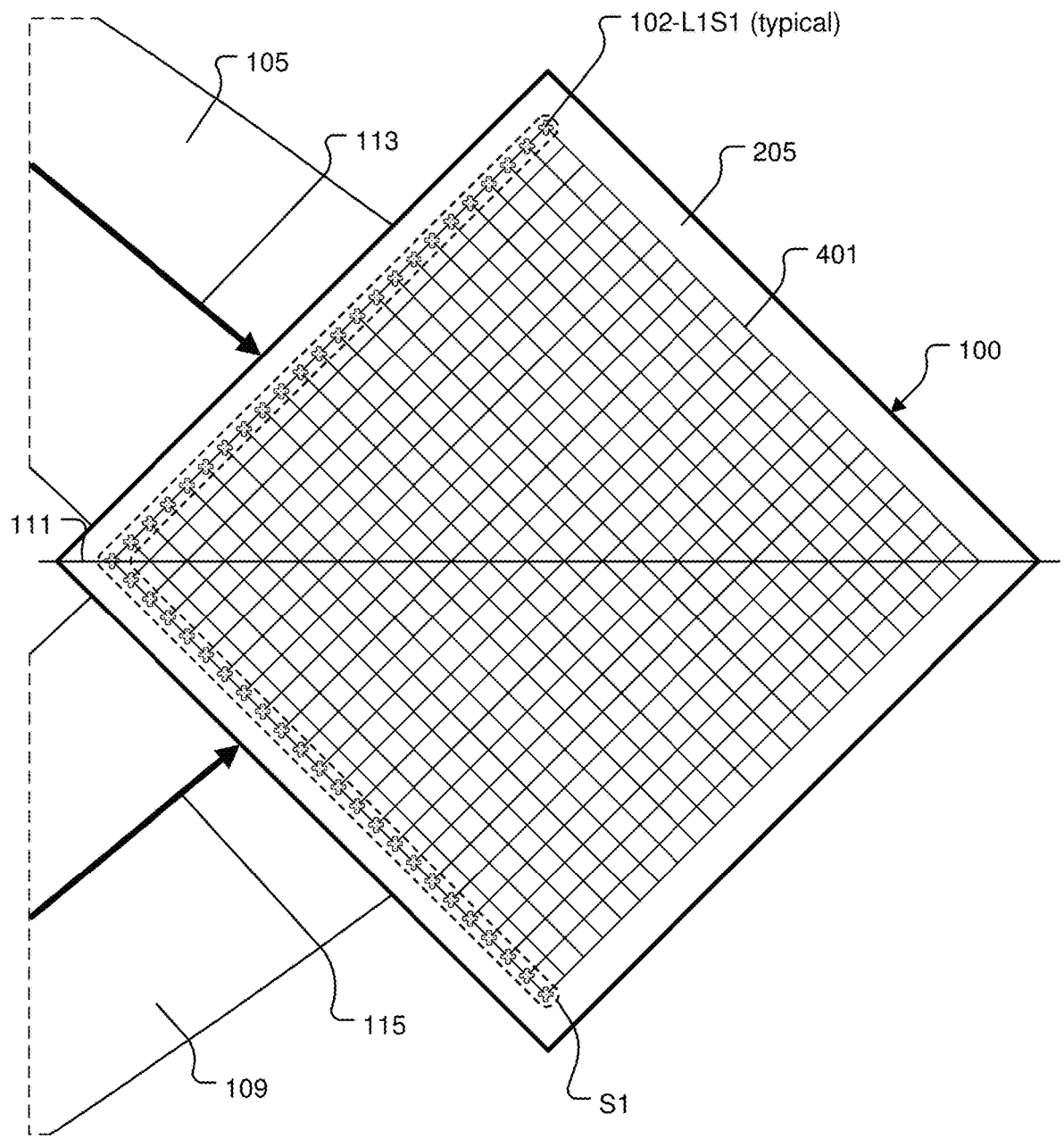
FIG. 4C shows the scattering elements of the primary layer (level L1) arranged in the v-shaped section S1, in accordance with some embodiments.
Figure 4D:
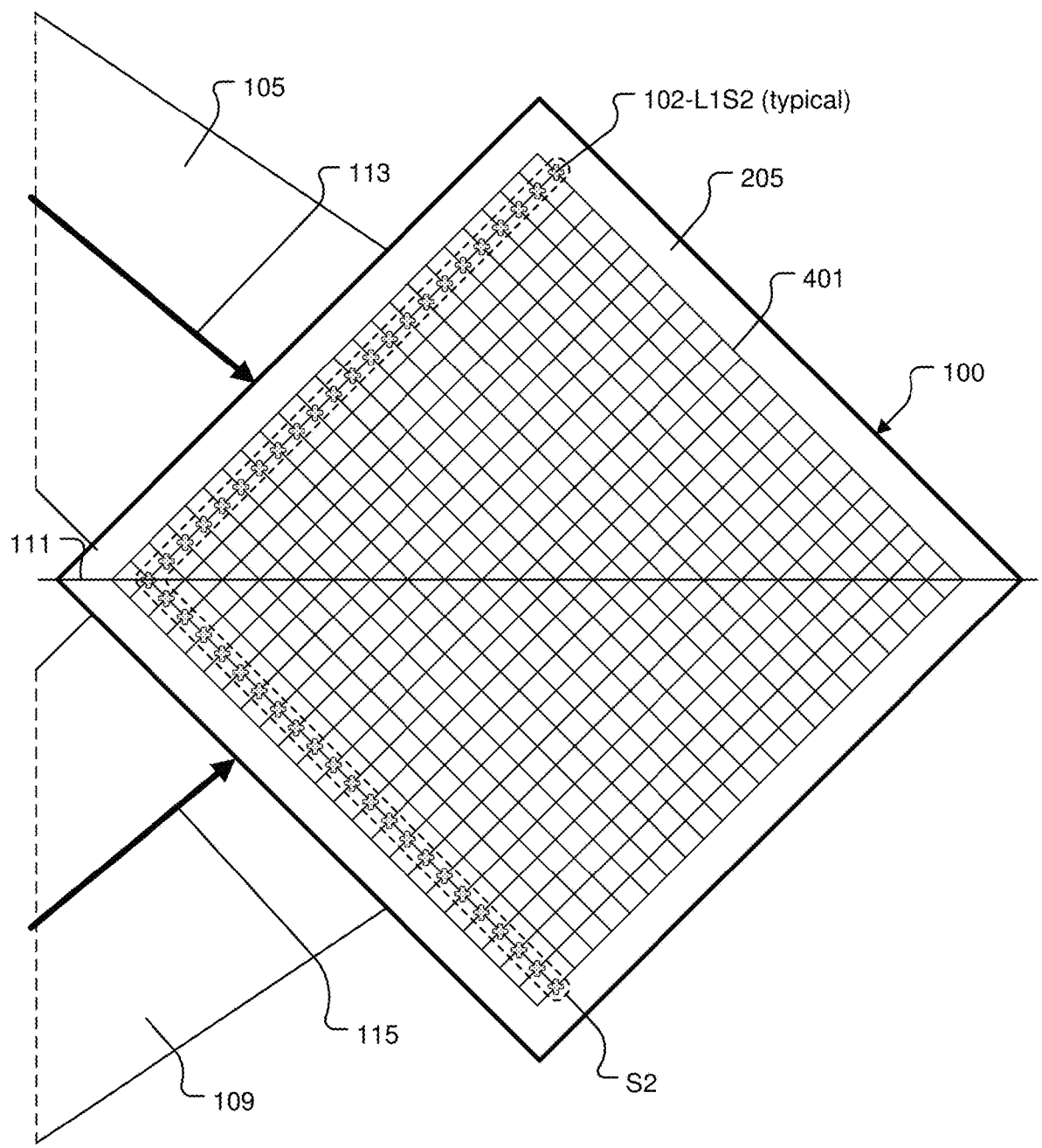
FIG. 4D shows the scattering elements of the primary layer (level L1) arranged in the v-shaped section S2, in accordance with some embodiments.
Figure 4E:
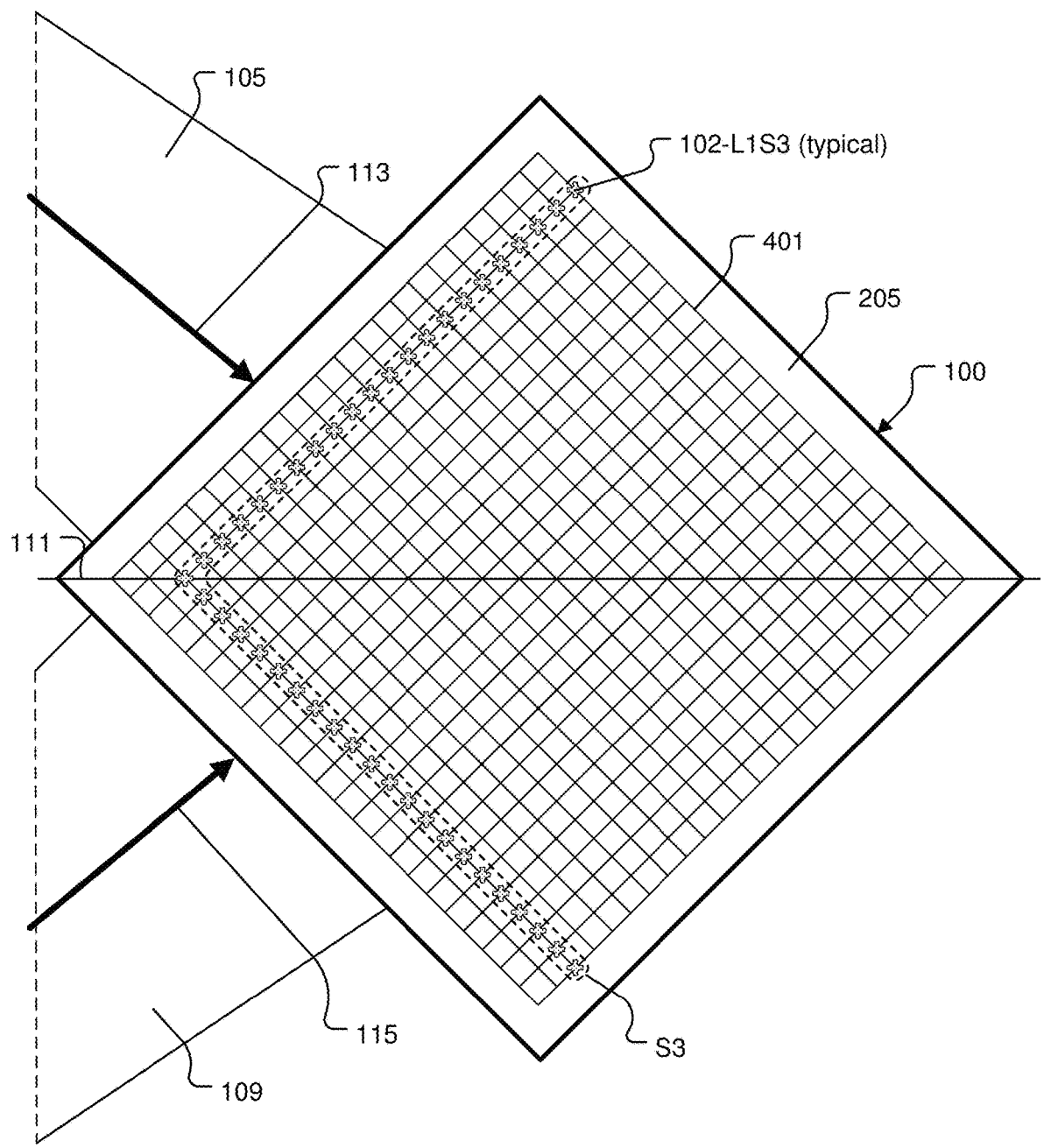
FIG. 4E shows the scattering elements of the primary layer (level L1) arranged in the v-shaped section S3, in accordance with some embodiments.
Figure 4F:
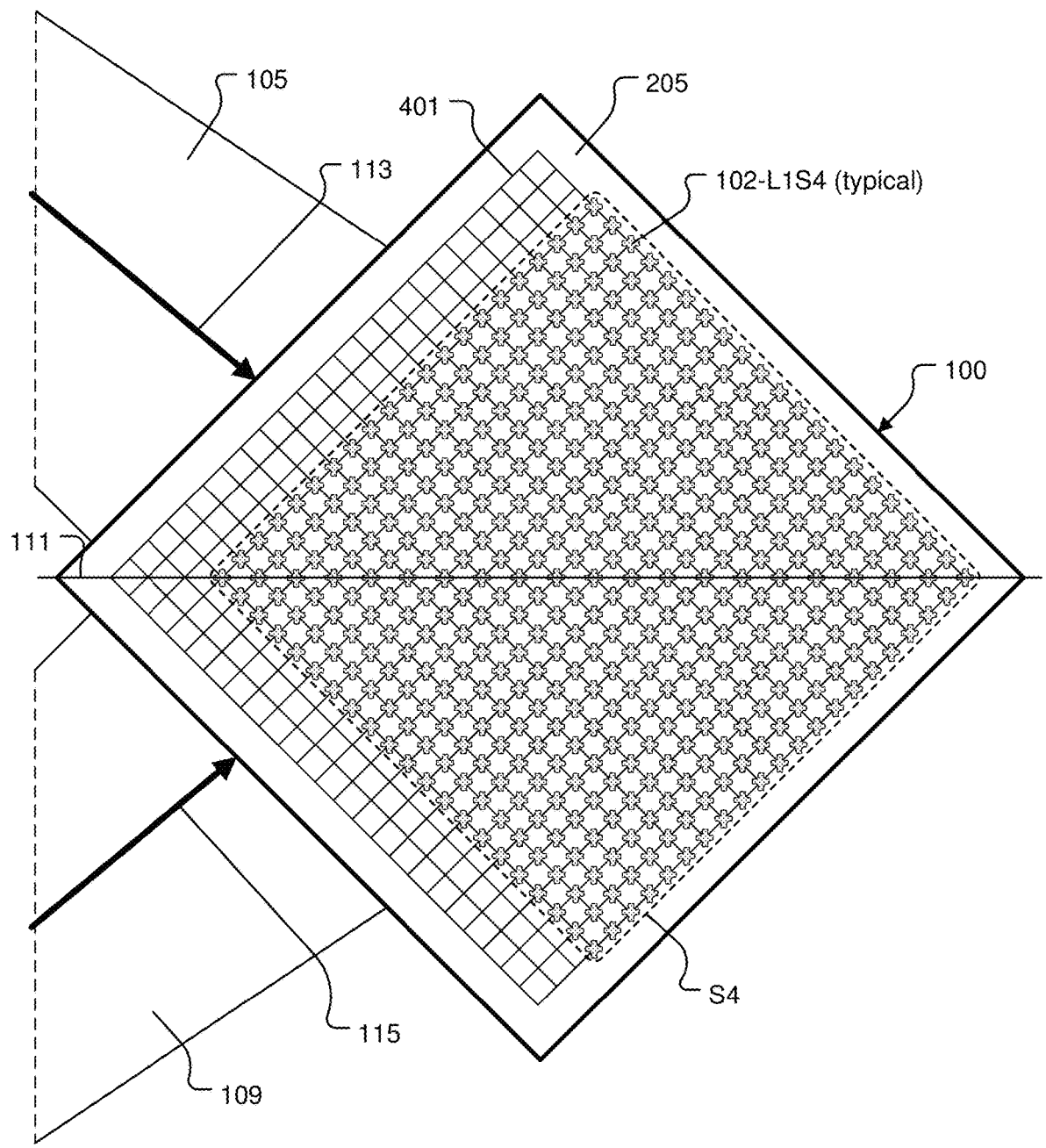
FIG. 4F shows the scattering elements of the primary layer (level L1) arranged in the polygonal-shaped section S4, in accordance with some embodiments.

In the example vertical grating coupler 100 of FIG. 4A, the scattering elements 102-L1S1 of the primary layer 205 (level L1) are arranged in a v-shaped section S1. FIG. 4C shows the scattering elements 102-L1S1 of the primary layer 205 (level L1) arranged in the v-shaped section S1, in accordance with some embodiments. Also, the scattering elements 102-L1S2 of the primary layer 205 (level L1) are arranged in a v-shaped section S2 that is located behind the v-shaped section S1 relative to the propagation directions of the incoming light as indicated by arrows 113 and 115. FIG. 4D shows the scattering elements 102-L1S2 of the primary layer 205 (level L1) arranged in the v-shaped section S2, in accordance with some embodiments. Also, the scattering elements 102-L1S3 of the primary layer 205 (level L1) are arranged in a v-shaped section S3 that is located behind the v-shaped section S2 relative to the propagation directions of the incoming light as indicated by arrows 113 and 115. FIG. 4E shows the scattering elements 102-L1S3 of the primary layer 205 (level L1) arranged in the v-shaped section S3, in accordance with some embodiments. Also, the scattering elements 102-L1S4 of the primary layer 205 (level L1) are arranged in a polygonal-shaped section S4 that is located behind the v-shaped section S3 relative to the propagation directions of the incoming light as indicated by arrows 113 and 115. FIG. 4F shows the scattering elements 102-L1S4 of the primary layer 205 (level L1) arranged in the polygonal-shaped section S4, in accordance with some embodiments. In this manner, in some embodiments, the scattering elements 102-L1S1, 102-L1S2, 102-L1S3, and 102-L1S4 in the respective sections S1, S2, S3, and S4 are configured to implement apodization of light scattering strength along the incoming light propagation directions indicated by arrows 113 and 115.

The apodization of light scattering strength is implemented by providing weaker light scattering elements closer to the first and second optical waveguide tapers 105 and 109, and by providing progressively stronger light scattering elements along the light propagation directions (arrows 113, 115) moving away from the first and second optical waveguide tapers 105 and 109 toward a central region of the vertical grating coupler 100. In various embodiments, the light scattering strength of a given scattering element 102 (e.g., providing weaker (less) light scattering versus providing stronger (more) light scattering) is controlled by controlling the shape and/or size and/or orientation and/or material of the given scattering element 102. For example, smaller sized scattering elements 102 will have less interaction across the wavefront of the incoming light and will therefore scatter less of the incoming light. Conversely, larger sized scattering elements 102 will have more interaction across the wavefront of the incoming light and will therefore scatter more of the incoming light. In this manner, in some embodiments, the apodization of light scattering strength is implemented by configuring the light scattering elements 102-L1S1 in the v-shaped section S1 to have smaller size than the light scattering elements 102-L1S2 in the v-shaped section S2; and by configuring the light scattering elements 102-L1S2 in the v-shaped section S2 to have smaller size than the light scattering elements 102-L1S3 in the v-shaped section S3; and by configuring the light scattering elements 102-L1S3 in the v-shaped section S3 to have smaller size than the light scattering elements 102-L1S4 in the polygonal-shaped section S4. Also, in some embodiments, the apodization of light scattering strength is supported by configuring the light scattering elements 102-L1S1 in the v-shaped section S1 to have a smaller cross-section for interaction with the wavefront of the incoming light than the light scattering elements 102-L1S2 in the v-shaped section S2; and by configuring the light scattering elements 102-L1S2 in the v-shaped section S2 to have a smaller cross-section for interaction with the wavefront of the incoming light than the light scattering elements 102-L1S3 in the v-shaped section S3; and by configuring the light scattering elements 102-L1S3 in the v-shaped section S3 to have a smaller cross-section for interaction with the wavefront of the incoming light than the light scattering elements 102-L1S4 in the polygonal-shaped section S4. In various embodiments, the cross-section for interaction with the wavefront of the incoming light of a given scattering element (102-L1S1, 102-L1S2, 102-L1S3, 102-L1S4) is controlled by configuring the size and/or shape and/or orientation of the given scattering element (102-L1S1, 102-L1S2, 102-L1S3, 102-L1S4) with respect to the propagation direction (113, 115) of the wavefront of the incoming light.

Therefore, in some embodiments, the principle of apodization is implemented by providing weakly-scattering elements near the optical waveguide tapers 105 and 109 and more strongly-scattering elements near the center of the off-chip beam of light corresponding to the central region of the vertical grating coupler 100 along the plane of symmetry 111. For example, the scattering elements 102-L1S1 in the v-shaped section S1 closest to the optical waveguide tapers 105, 109 are sized to create small deviations from the nominal optical guiding structure of the primary layer 205 that would otherwise exist in the absence of the scattering elements 102-L1S1. Increased deviation (in refractive index) from the nominal optical guiding structure of the primary layer 205 is provided in a progressive manner by the scattering elements 102-L1S2, 102-L1S3, and 102-L1S4 in the sections S2, S3, and S4 respectively. In the region near the center of the vertical grating coupler 100 along the plane of symmetry 111, the scattering elements 102-L1S4 having the largest light scattering strength are disposed to create the largest deviation (in refractive index) from the nominal optical guiding structure of the primary layer 205, which results in more light scattering into the off-chip beam of light.

Figure 5A:
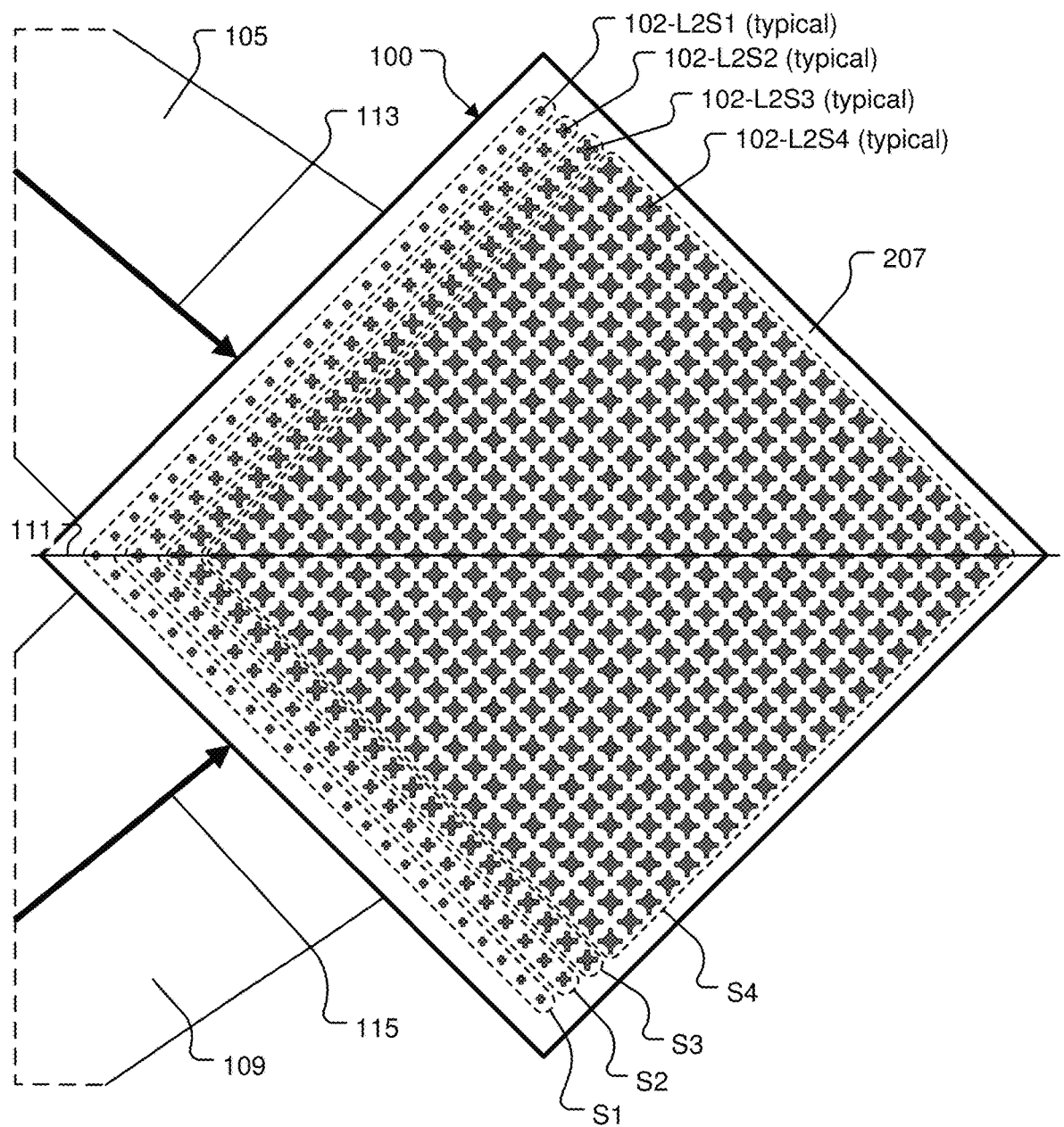
FIG. 5A shows an example configuration of the secondary layer, in accordance with some embodiments.

FIG. 5A shows an example configuration of the secondary layer 207, in accordance with some embodiments. Scattering elements 102-L2S1, 102-L2S2, 102-L2S3, and 102-L2S4 are positioned in reference to the grid 401 as shown in FIG. 4B. The scattering elements 102-L2S1, 102-L2S2, 102-L2S3, and 102-L2S4 are the "+" shapes (cross-shaped structures) shown in FIG. 5A. In some embodiments, a centerpoint (or centroid) of a given scattering element 102-L2S1, 102-L2S2, 102-L2S3, 102-L2S4 is positioned at a corresponding gridpoint of the grid 401. However, in some embodiments, the centerpoint (or centroid) of a given scattering element 102-L2S1, 102-L2S2, 102-L2S3, 102-L2S4 is positioned at a location that is a specified distance and direction from a corresponding gridpoint of the grid 401.

Figure 5B:
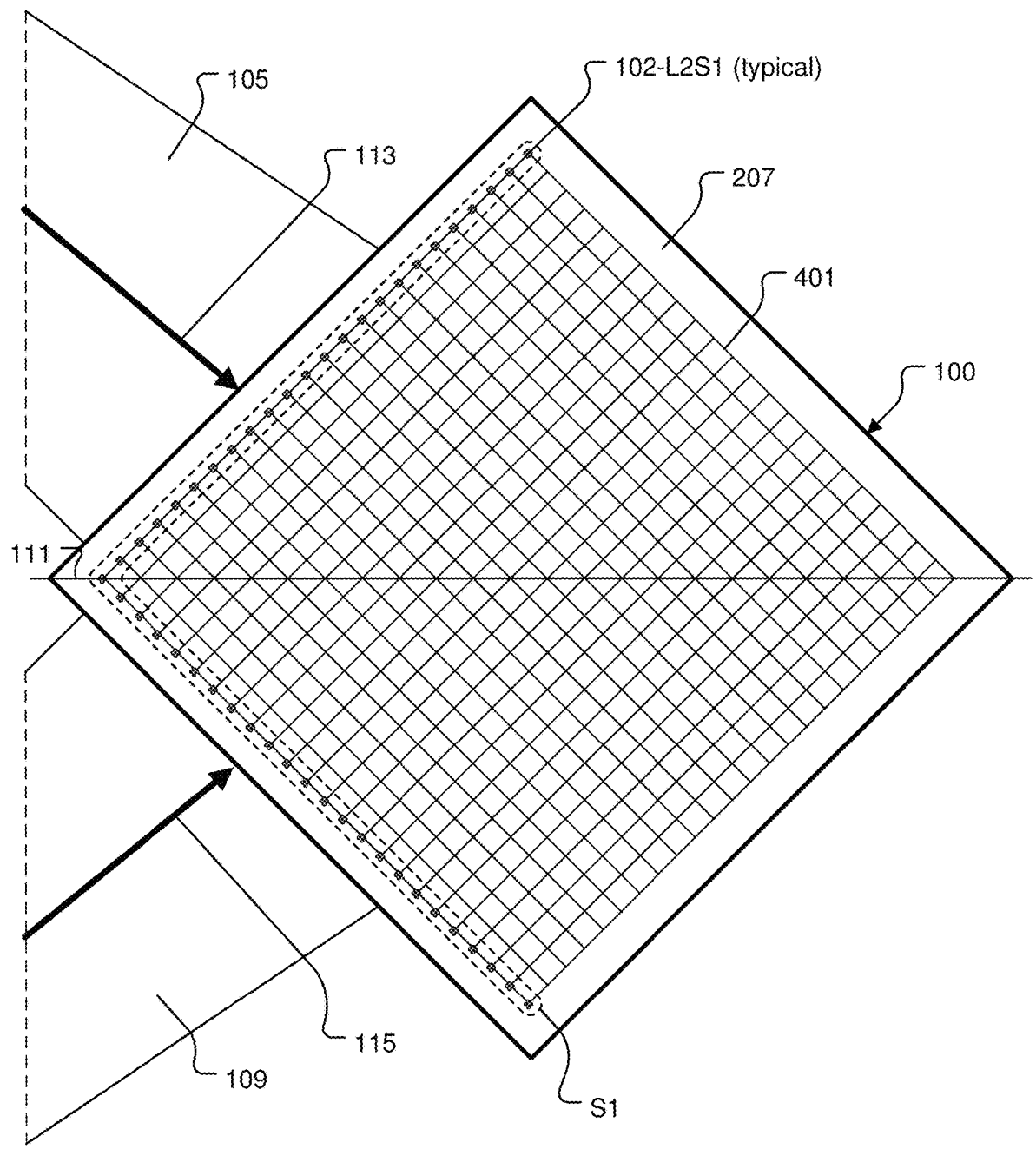
FIG. 5B shows the scattering elements of the secondary layer (level L2) arranged in the v-shaped section S1, in accordance with some embodiments.
Figure 5C:
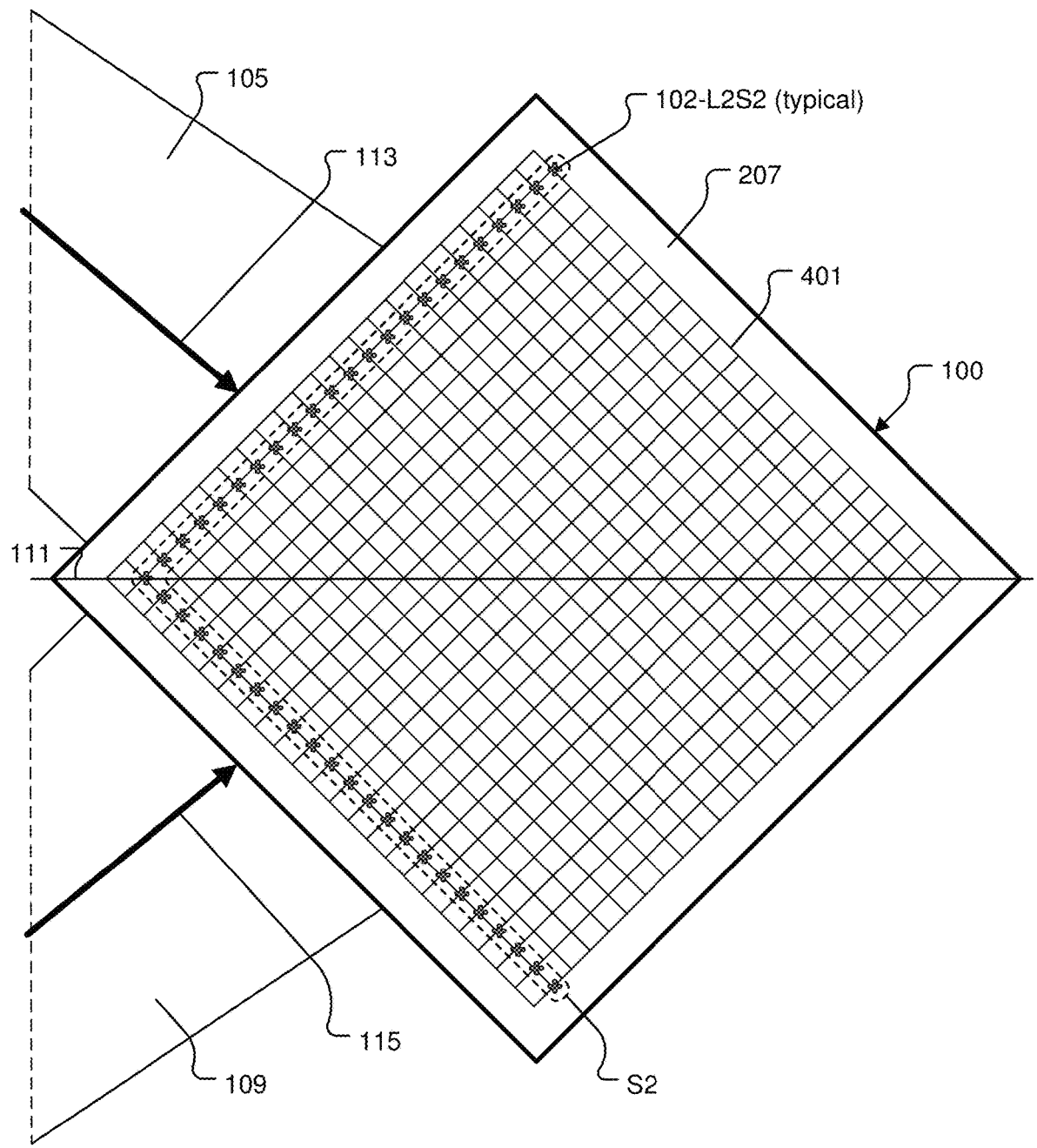
FIG. 5C shows the scattering elements of the secondary layer (level L2) arranged in the v-shaped section S2, in accordance with some embodiments.
Figure 5D:
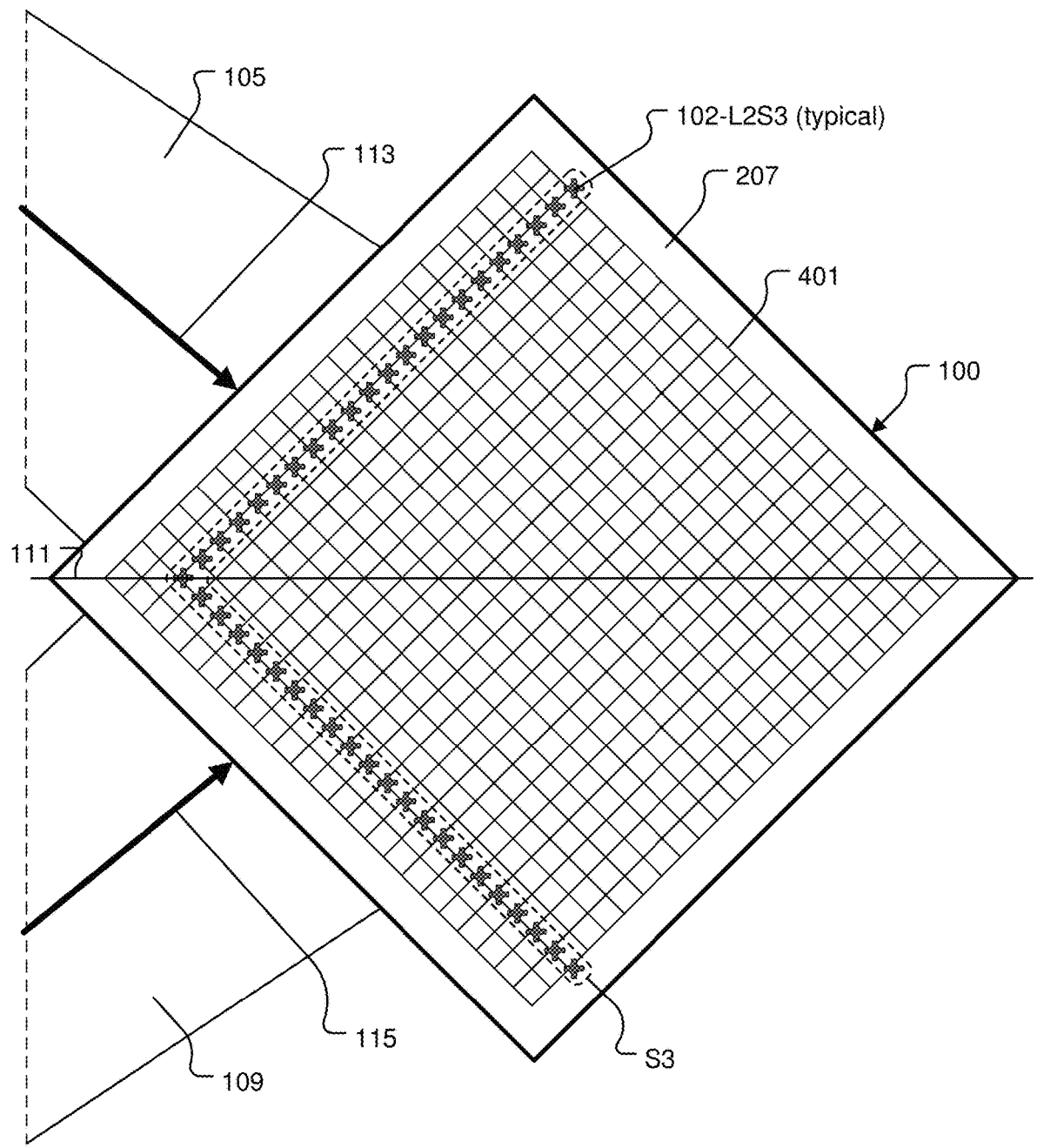
FIG. 5D shows the scattering elements of the secondary layer (level L2) arranged in the v-shaped section S3, in accordance with some embodiments.
Figure 5E:
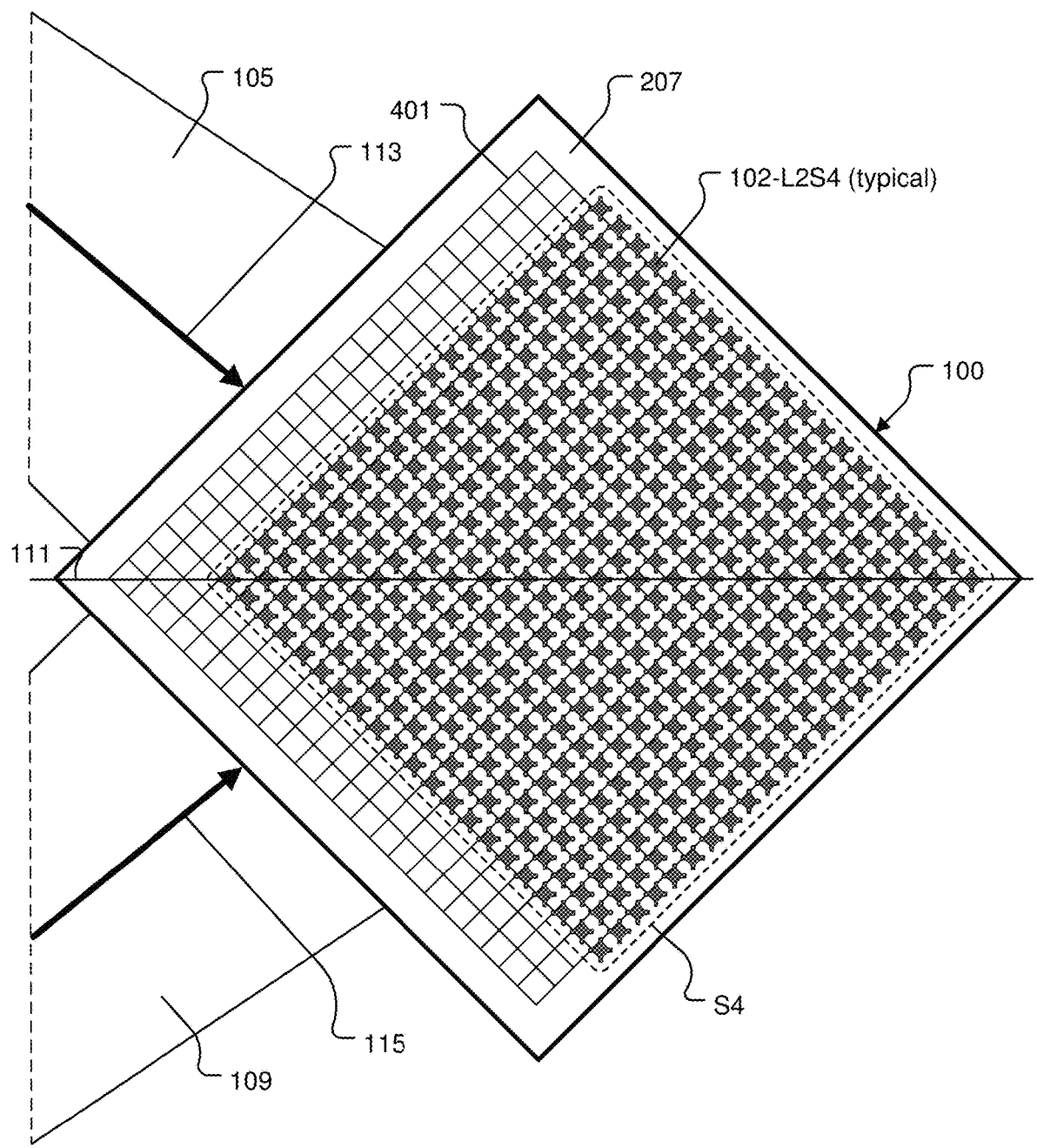
FIG. 5E shows the scattering elements of the secondary layer (level L2) arranged in the polygonal-shaped section S4, in accordance with some embodiments.

In the example vertical grating coupler 100 of FIG. 5A, the scattering elements 102-L2S1 of the secondary layer 207 (level L2) are arranged in a v-shaped section S1. FIG. 5B shows the scattering elements 102-L2S1 of the secondary layer 207 (level L2) arranged in the v-shaped section S1, in accordance with some embodiments. Also, the scattering elements 102-L2S2 of the secondary layer 207 (level L2) are arranged in a v-shaped section S2 that is located behind the v-shaped section S1 relative to the propagation directions of the incoming light as indicated by arrows 113 and 115. FIG. 5C shows the scattering elements 102-L2S2 of the secondary layer 207 (level L2) arranged in the v-shaped section S2, in accordance with some embodiments. Also, the scattering elements 102-L2S3 of the secondary layer 207 (level L2) are arranged in a v-shaped section S3 that is located behind the v-shaped section S2 relative to the propagation directions of the incoming light as indicated by arrows 113 and 115. FIG. 5D shows the scattering elements 102-L2S3 of the secondary layer 207 (level L2) arranged in the v-shaped section S3, in accordance with some embodiments. Also, the scattering elements 102-L2S4 of the secondary layer 207 (level L2) are arranged in a polygonal-shaped section S4 that is located behind the v-shaped section S3 relative to the propagation directions of the incoming light as indicated by arrows 113 and 115. FIG. 5E shows the scattering elements 102-L2S4 of the secondary layer 207 (level L2) arranged in the polygonal-shaped section S4, in accordance with some embodiments. In this manner, in some embodiments, the scattering elements 102-L2S1, 102-L2S2, 102-L2S3, and 102-L2S4 in the respective sections S1, S2, S3, and S4 are configured to implement apodization of light scattering strength along the incoming light propagation directions indicated by arrows 113 and 115.

As with the primary layer 205, the apodization of light scattering strength in the secondary layer 207 is implemented by providing weaker light scattering elements closer to the first and second optical waveguide tapers 105 and 109, and by providing progressively stronger light scattering elements along the light propagation directions (arrows 113, 115) moving away from the first and second optical waveguide tapers 105 and 109 toward the central region of the vertical grating coupler 100. In various embodiments, the light scattering strength of the scattering elements 102-L2S1, 102-L2S2, 102-L2S3, 102-L2S4 is controlled by controlling the shape and/or size and/or orientation and/or material of the scattering elements 102-L2S1, 102-L2S2, 102-L2S3, 102-L2S4. In some embodiments, the apodization of light scattering strength is implemented by configuring the light scattering elements 102-L2S1 in the v-shaped section S1 to have smaller size than the light scattering elements 102-L2S2 in the v-shaped section S2; and by configuring the light scattering elements 102-L2S2 in the v-shaped section S2 to have smaller size than the light scattering elements 102-L2S3 in the v-shaped section S3; and by configuring the light scattering elements 102-L2S3 in the v-shaped section S3 to have smaller size than the light scattering elements 102-L2S4 in the polygonal-shaped section S4. Also, in some embodiments, the apodization of light scattering strength is supported by configuring the light scattering elements 102-L2S1 in the v-shaped section S1 to have a smaller cross-section for interaction with the wavefront of the incoming light than the light scattering elements 102-L2S2 in the v-shaped section S2; and by configuring the light scattering elements 102-L2S2 in the v-shaped section S2 to have a smaller cross-section for interaction with the wavefront of the incoming light than the light scattering elements 102-L2S3 in the v-shaped section S3; and by configuring the light scattering elements 102-L2S3 in the v-shaped section S3 to have a smaller cross-section for interaction with the wavefront of the incoming light than the light scattering elements 102-L2S4 in the polygonal-shaped section S4. In various embodiments, the cross-section for interaction with the wavefront of the incoming light of a given scattering element (102-L2S1, 102-L2S2, 102-L2S3, 102-L2S4) is controlled by configuring the size and/or shape and/or orientation of the given scattering element (102-L2S1, 102-L2S2, 102-L2S3, 102-L2S4) with respect to the propagation direction (113, 115) of the wavefront of the incoming light.

Therefore, in some embodiments, the principle of apodization is implemented in the secondary layer 207 by providing weakly-scattering elements near the optical waveguide tapers 105 and 109 and more strongly-scattering elements near the center of the off-chip beam of light corresponding to the central region of the vertical grating coupler 100 along the plane of symmetry 111. For example, the scattering elements 102-L2S1 in the v-shaped section S1 closest to the optical waveguide tapers 105, 109 are sized to create small deviations (in refractive index) from the nominal optical guiding structure of the secondary layer 207 that would otherwise exist in the absence of the scattering elements 102-L2S1. Increased deviation (in refractive index) from the nominal optical guiding structure of the secondary layer 207 is provided in a progressive manner by the scattering elements 102-L2S2, 102-L2S3, and 102-L2S4 in the sections S2, S3, and S4 respectively. In the region near the center of the vertical grating coupler 100 along the plane of symmetry 111, the scattering elements 102-L2S4 having the largest light scattering strength are disposed to create the largest deviation (in refractive index) from the nominal optical guiding structure of the secondary layer 207, which results in more light scattering into the off-chip beam of light.

In some embodiments, the size and shape of scattering elements within a given layer and a given section are substantially the same, where the given section includes at least two rows of scattering elements located at approximately the same distance from the nearest optical waveguide taper 105, 109. For example, in some embodiments, the scattering elements 102-L1S1 in section S1 of the primary layer 205 have a first size and a first shape, and the scattering elements 102-L2S1 in section S1 of the secondary layer 207 have a second size and a second shape. Also, in some embodiments, the scattering elements 102-L1S2 in section S2 of the primary layer 205 have a third size and a third shape, and the scattering elements 102-L2S2 in section S2 of the secondary layer 207 have a fourth size and a fourth shape. Also, in some embodiments, the scattering elements 102-L1S3 in section S3 of the primary layer 205 have a fifth size and a fifth shape, and the scattering elements 102-L2S3 in section S3 of the secondary layer 207 have a sixth size and a sixth shape. Also, in some embodiments, the scattering elements 102-L1S4 in section S4 of the primary layer 205 have a seventh size and a seventh shape, and the scattering elements 102-L2S4 in section S4 of the secondary layer 207 have an eighth size and an eighth shape.

Because the sections S1, S2, and S3 (of both the primary layer 205 and the secondary layer 207) are v-shaped, incoming light from the optical waveguide tapers 105 and 109 can be thought of as sequentially passing through the first section S1, then through the second section S2, then through the third section S3, and then into the fourth section S4. In some embodiments, in view of this sequential propagation of light through sections S1, S2, S3, and S4, apodization includes configuration/tuning of the scattering elements within a given section in a given layer to achieve a desired apodization effect. In some embodiments, sizes and shapes of scattering elements 102 within a given section in a given layer are symmetrized, and/or tuned to optimize efficiency, process compatibility, and/or other parameters. Therefore, in some embodiments, the size and/or shape and/or orientation of scattering elements 102 within a given section (S1, S2, S3, S4) in a given layer (205, 207) are not identical, but are systematically varied to achieve a desired apodization effect.

In some embodiments, the vertical grating coupler 100 is approximately symmetric with respect to the plane of symmetry 111 (see FIG. 1B) that extends normal to the chip's surface. In these embodiments, the optical waveguide tapers 105 and 109 are placed (sized, shaped, positioned, and oriented) approximately symmetrically with respect to reflection across the plane of symmetry 111. In these embodiments, the primary layer 205 provides for light reflection symmetry across a line of symmetry corresponding to intersection of the plane of symmetry 111 with the primary layer 205. Also, in these embodiments, the secondary layer 207 provides for light reflection symmetry across a line of symmetry corresponding to intersection of the plane of symmetry 111 with the secondary layer 207. Therefore, in these embodiments, the axis of the center of the outgoing beam of light (such as indicated by arrows 213 in FIGS. 2A and 3A) falls approximately within the plane of symmetry 111.

In some embodiments, one or more scattering elements 102 within the primary layer 205 are grouped with one or more scattering elements 102 within the secondary layer 207 into a scattering element group to provide a prescribed light scattering effect. For example, in some embodiments, a given scattering element 102 within the primary layer 205 is grouped with a given scattering element 102 within the secondary layer 207 to form a scattering element group, such that the scattering element 102 within the scattering element group in the primary layer 205 and the scattering element 102 within the scattering element group in the secondary layer 205 work together to direct light into the outgoing beam of light as indicated by arrows 213 in FIGS. 2A and 3A. For example, in some embodiments, a scattering element group includes one scattering element 102 in the primary layer 205 and one scattering element 102 in the secondary layer 207. In some embodiments, the scattering element group is configured so that an offset exists between a position of the scattering element 102 in the primary layer 205 and a position of the scattering element 102 in the secondary layer 207, where the offset is along the direction of the off-chip outgoing beam of light (along a direction that is parallel to both the plane of symmetry 111 and the chip, e.g., the bottom surface of the BOX layer 201 (see FIGS. 2A, 3A)).

In some embodiments, highly directional light scattering is achieved through phase-matching. In some embodiments, the offset between the two scattering elements 102 of the scattering element group (the offset between the scattering element 102 in the primary layer 205 and the scattering element 102 in the secondary layer 207) is defined to lead to destructive interference in one of the vertical directions, so that light is more efficiently coupled into the other vertical direction, where the offset is in the direction parallel to both the plane of symmetry 111 and the chip. In some embodiments, where the two optical waveguide tapers 105 and 109 direct incoming light into the vertical grating coupler 100 in the directions 113 and 115, respectively, on adjacent lateral sides 100A and 100B of the vertical grating coupler 100, the offset between the two scattering elements 102 of the scattering element group in the different vertical layers (in the primary layer 205 and secondary layer 207, respectively) is made along a direction that is substantially half-way between the two taper light propagation directions 113 and 115. In this manner, in the example vertical grating coupler 100, the offset between the two scattering elements 102 in the different vertical layers of the scattering element group is made along a direction that is substantially parallel to both the plane of symmetry 111 and the plane of the chip, e.g., bottom of the BOX layer 201.

Figure 6:
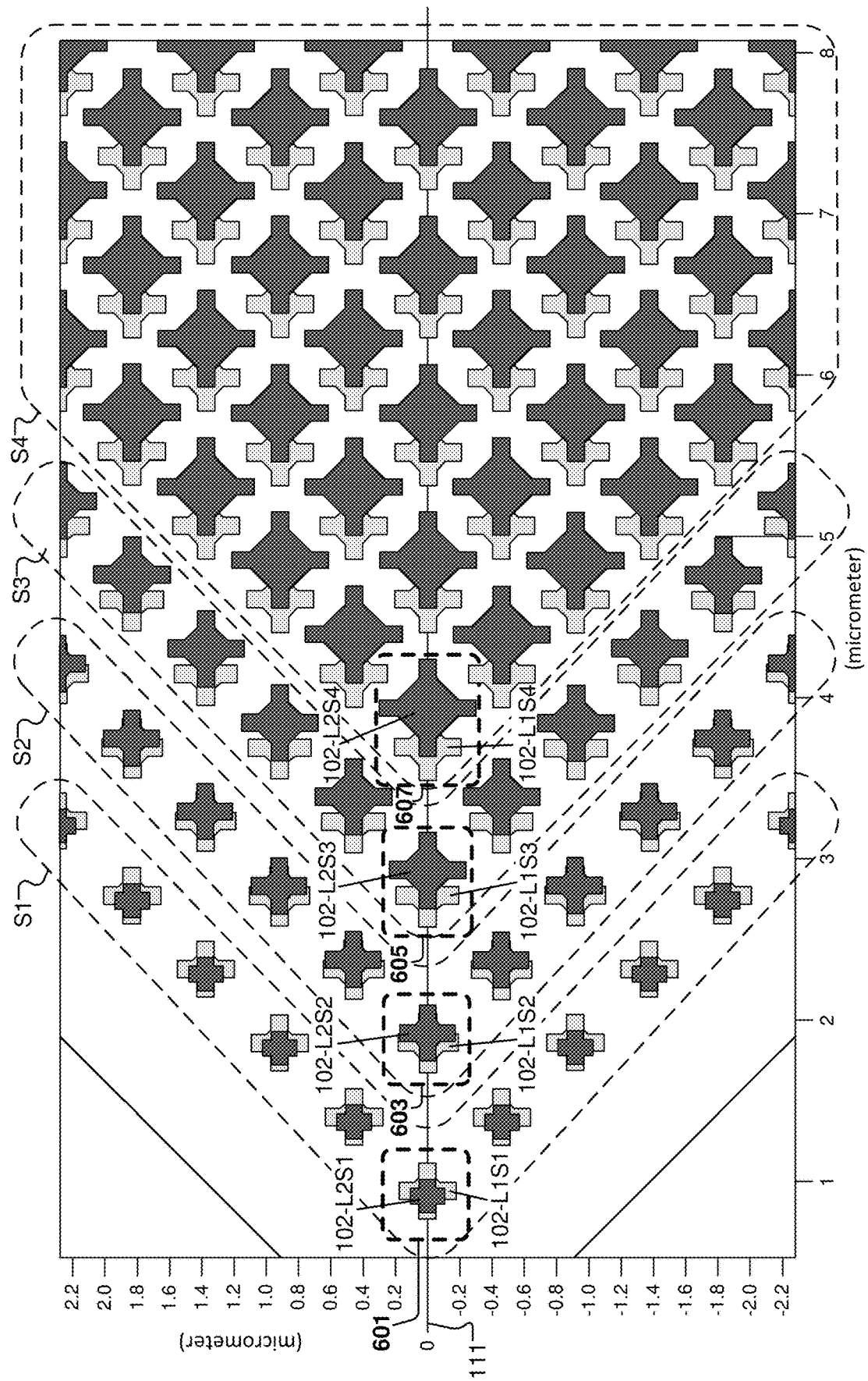
FIG. 6 shows a close-up top view of the vertical grating coupler in which four example scattering element groups are identified, in accordance with some embodiments.
Figure 7A:
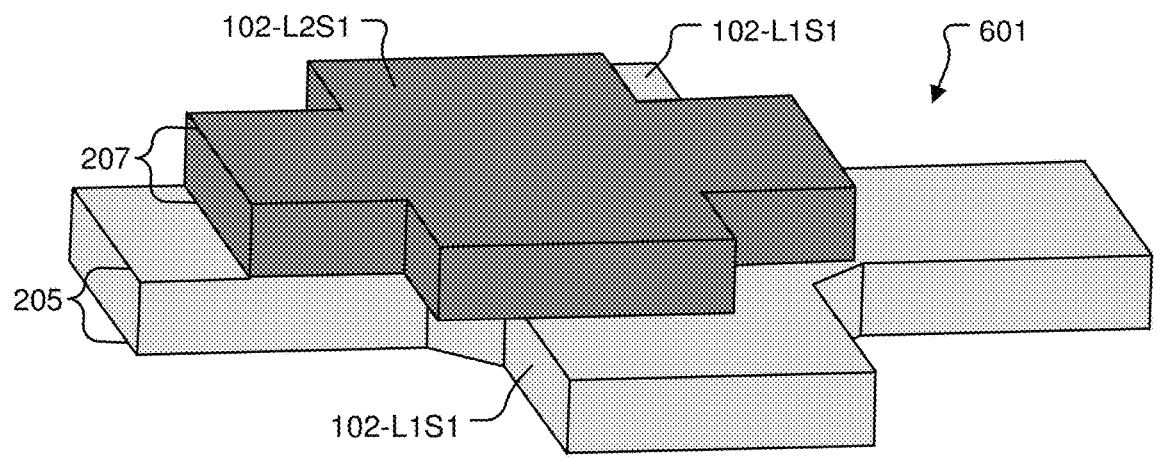
FIG. 7A shows a perspective view of the first example scattering element group, in accordance with some embodiments.
Figure 7B:
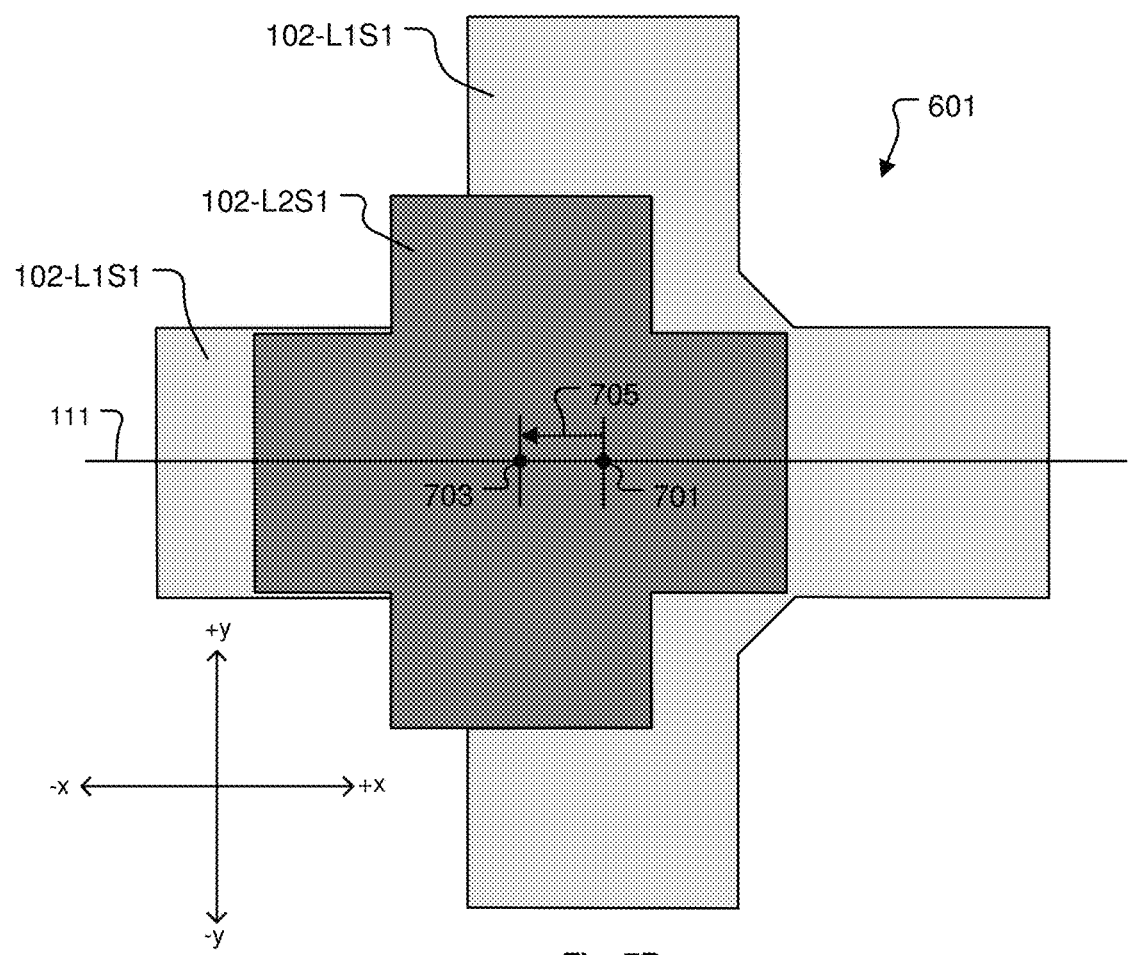
FIG. 7B shows a top view of the first example scattering element group, in accordance with some embodiments.

FIG. 6 shows a close-up top view of the vertical grating coupler 100 in which four example scattering element groups 601, 603, 605, and 607 are identified, in accordance with some embodiments. A first example scattering element group 601 includes one scattering element 102-L1S1 in the primary layer 205 in the first section S1, and one scattering element 102-L2S1 in the secondary layer 207 in the first section S1. In the example vertical grating coupler 100, the first example scattering element group 601 is repeated throughout the first v-shaped section S1. In this manner, each scattering element 102-L1S1 in the first section S1 in the primary layer 205 belongs to a corresponding instance of the first example scattering element group 601, and each scattering element 102-L2S1 in the first section S1 in the secondary layer 207 also belongs to a corresponding instance of the first example scattering element group 601. FIG. 7A shows a perspective view of the first example scattering element group 601, in accordance with some embodiments. FIG. 7B shows a top view of the first example scattering element group 601, in accordance with some embodiments. In the first example scattering element group 601, a centerpoint (centroid) 703 of the scattering element 102-L2S1 in the secondary layer 207 is offset in the negative x-direction by a distance 705 relative to a centerpoint (centroid) 701 of the corresponding scattering element 102-L1S1 in the primary layer 205, where the x-direction is parallel to both the plane of symmetry 111 and the plane of the chip. Also, in the first example scattering element group 601, the centerpoint (centroid) 703 of the scattering element 102-L2S1 in the secondary layer 207 and the centerpoint (centroid) 701 of the corresponding scattering element 102-L1S1 in the primary layer 205 are co-located at a substantially same position in the y-direction, where the y-direction is perpendicular to the plane of symmetry 111 and parallel to the plane of the chip. In some embodiments, the centerpoint (centroid) 701 of the scattering element 102-L1S1 of the first example scattering element group 601 is located in the primary layer 205 at a gridpoint of the grid 401 as shown in FIG. 4B.

Figure 8A:
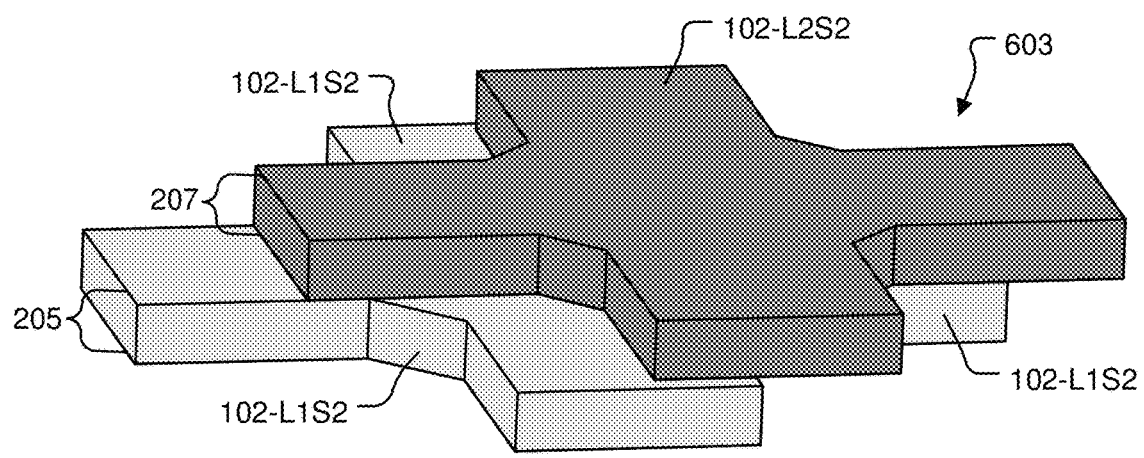
FIG. 8A shows a perspective view of the second example scattering element group, in accordance with some embodiments.
Figure 8B:
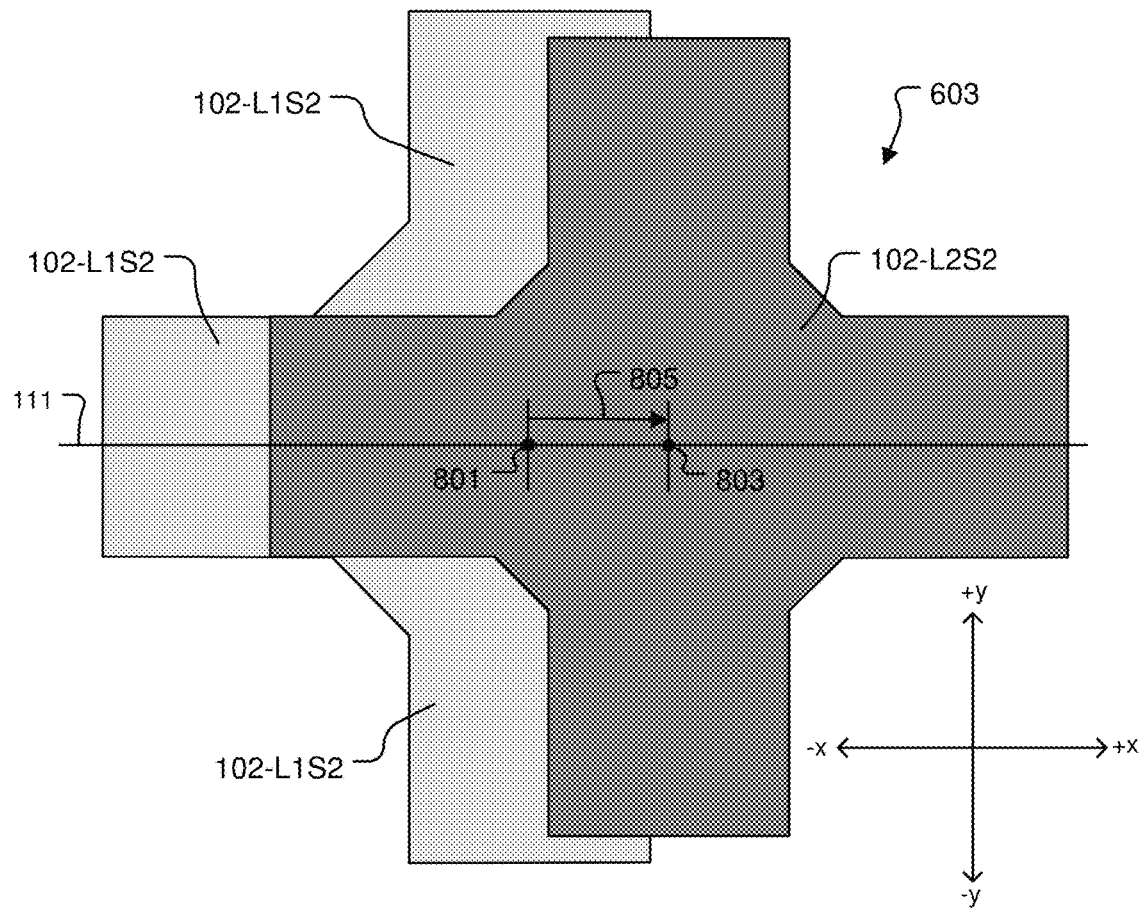
FIG. 8B shows a top view of the second example scattering element group, in accordance with some embodiments.

FIG. 6 also shows a second example scattering element group 603 that includes one scattering element 102-L1S2 in the primary layer 205 in the second section S2, and one scattering element 102-L2S2 in the secondary layer 207 in the second section S2. In the example vertical grating coupler 100, the second example scattering element group 603 is repeated throughout the second v-shaped section S2. In this manner, each scattering element 102-L1S2 in the second section S2 in the primary layer 205 belongs to a corresponding instance of the second example scattering element group 603, and each scattering element 102-L2S2 in the second section S2 in the secondary layer 207 also belongs to a corresponding instance of the second example scattering element group 603. FIG. 8A shows a perspective view of the second example scattering element group 603, in accordance with some embodiments. FIG. 8B shows a top view of the second example scattering element group 603, in accordance with some embodiments. In the second example scattering element group 603, a centerpoint (centroid) 803 of the scattering element 102-L2S2 in the secondary layer 207 is offset in the positive x-direction by a distance 805 relative to a centerpoint (centroid) 801 of the corresponding scattering element 102-L1S2 in the primary layer 205, where the x-direction is parallel to both the plane of symmetry 111 and the plane of the chip. Also, in the second example scattering element group 603, the centerpoint (centroid) 803 of the scattering element 102-L2S2 in the secondary layer 207 and the centerpoint (centroid) 801 of the corresponding scattering element 102-L1S2 in the primary layer 205 are co-located at a substantially same position in the y-direction, where the y-direction is perpendicular to the plane of symmetry 111 and parallel to the plane of the chip. In some embodiments, the centerpoint (centroid) 801 of the scattering element 102-L1S2 of the second example scattering element group 603 is located in the primary layer 205 at a gridpoint of the grid 401 as shown in FIG. 4B.

Figure 9A:
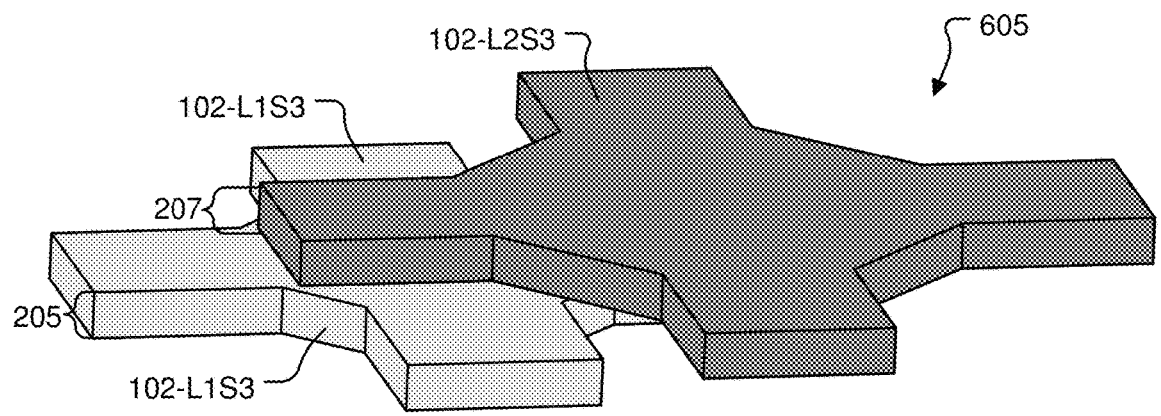
FIG. 9A shows a perspective view of the third example scattering element group, in accordance with some embodiments.
Figure 9B:
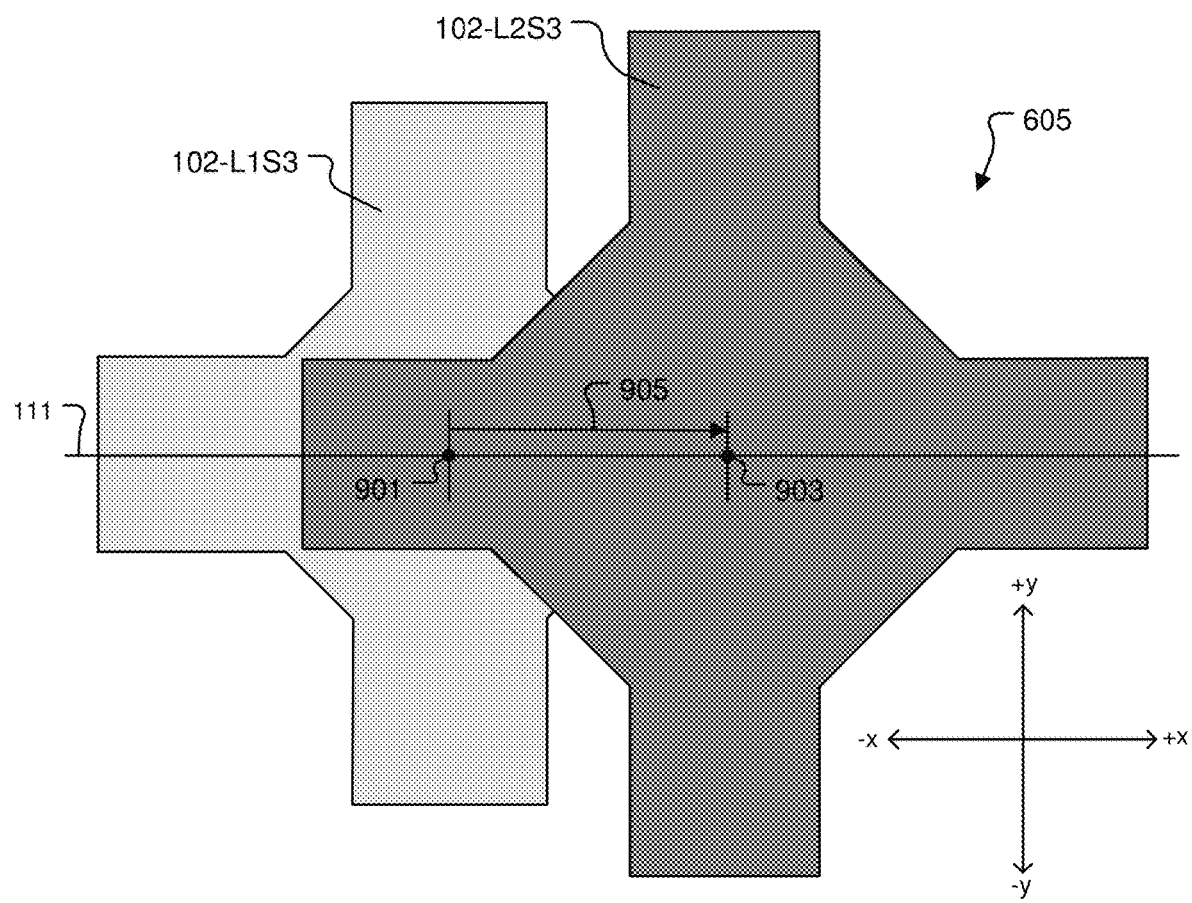
FIG. 9B shows a top view of the third example scattering element group, in accordance with some embodiments.

FIG. 6 also shows a third example scattering element group 605 that includes one scattering element 102-L1S3 in the primary layer 205 in the third section S3, and one scattering element 102-L2S3 in the secondary layer 207 in the third section S3. In the example vertical grating coupler 100, the third example scattering element group 605 is repeated throughout the third v-shaped section S3. In this manner, each scattering element 102-L1S3 in the third section S3 in the primary layer 205 belongs to a corresponding instance of the third example scattering element group 605, and each scattering element 102-L2S3 in the third section S3 in the secondary layer 207 also belongs to a corresponding instance of the third example scattering element group 605. FIG. 9A shows a perspective view of the third example scattering element group 605, in accordance with some embodiments. FIG. 9B shows a top view of the third example scattering element group 605, in accordance with some embodiments. In the third example scattering element group 605, a centerpoint (centroid) 903 of the scattering element 102-L2S3 in the secondary layer 207 is offset in the positive x-direction by a distance 905 relative to a centerpoint (centroid) 901 of the corresponding scattering element 102-L1S3 in the primary layer 205, where the x-direction is parallel to both the plane of symmetry 111 and the plane of the chip. Also, in the third example scattering element group 605, the centerpoint (centroid) 903 of the scattering element 102-L2S3 in the secondary layer 207 and the centerpoint (centroid) 901 of the corresponding scattering element 102-L1S3 in the primary layer 205 are co-located at a substantially same position in the y-direction, where the y-direction is perpendicular to the plane of symmetry 111 and parallel to the plane of the chip. In some embodiments, the centerpoint (centroid) 901 of the scattering element 102-L1S3 of the third example scattering element group 605 is located in the primary layer 205 at a gridpoint of the grid 401 as shown in FIG. 4B.

Figure 10A:
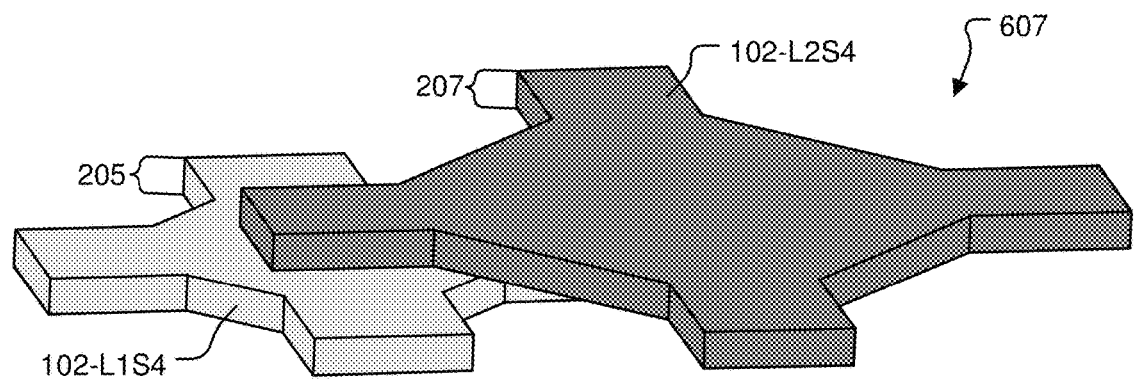
FIG. 10A shows a perspective view of the fourth example scattering element group, in accordance with some embodiments.
Figure 10B:
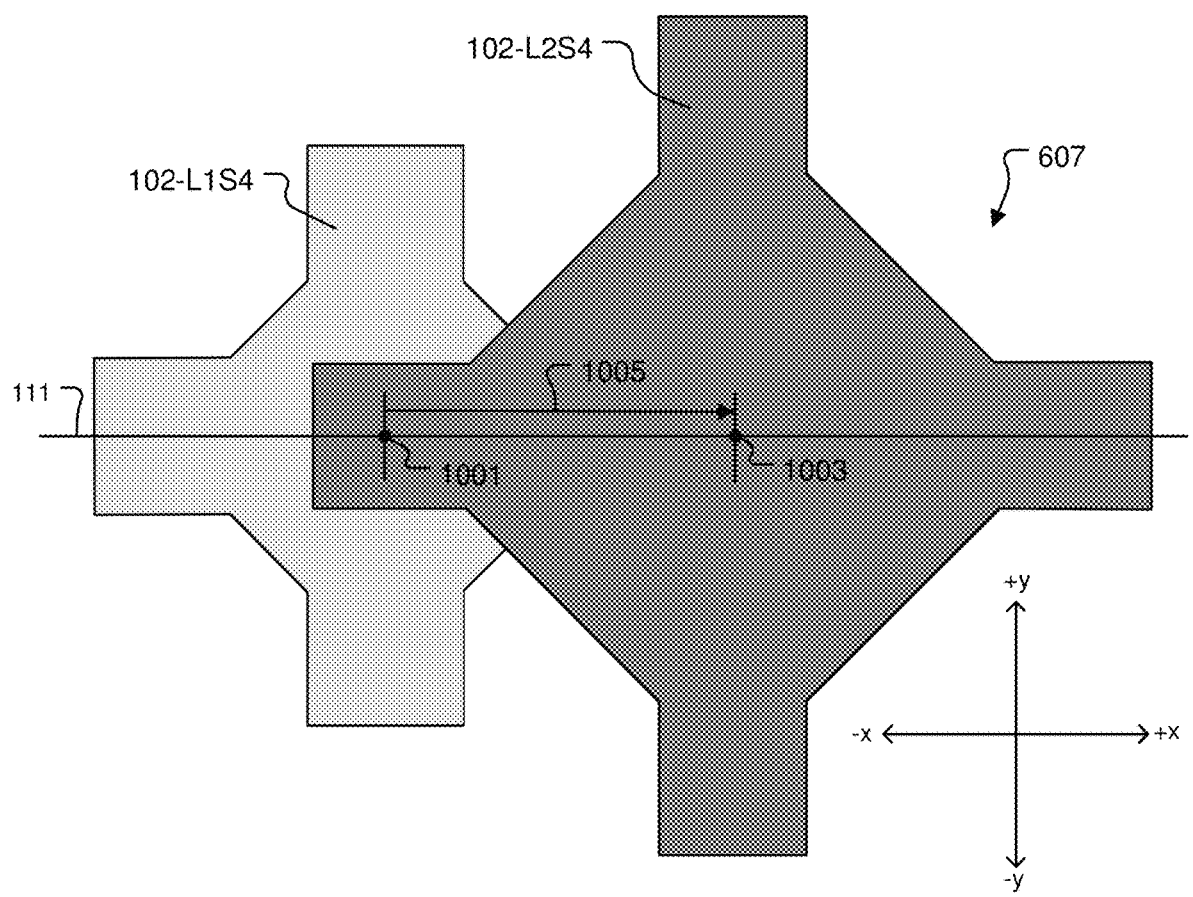
FIG. 10B shows a top view of the fourth example scattering element group, in accordance with some embodiments.

FIG. 6 also shows a fourth example scattering element group 607 that includes one scattering element 102-L1S4 in the primary layer 205 in the fourth section S4, and one scattering element 102-L2S4 in the secondary layer 207 in the fourth section S4. In the example vertical grating coupler 100, the fourth example scattering element group 607 is repeated throughout the polygonal-shaped section S4. In this manner, each scattering element 102-L1S4 in the fourth section S4 in the primary layer 205 belongs to a corresponding instance of the fourth example scattering element group 607, and each scattering element 102-L2S4 in the fourth section S4 in the secondary layer 207 also belongs to a corresponding instance of the fourth example scattering element group 607. FIG. 10A shows a perspective view of the fourth example scattering element group 607, in accordance with some embodiments. FIG. 10B shows a top view of the fourth example scattering element group 607, in accordance with some embodiments. In the fourth example scattering element group 607, a centerpoint (centroid) 1003 of the scattering element 102-L2S4 in the secondary layer 207 is offset in the positive x-direction by a distance 1005 relative to a centerpoint (centroid) 1001 of the corresponding scattering element 102-L1S4 in the primary layer 205, where the x-direction is parallel to both the plane of symmetry 111 and the plane of the chip. Also, in the fourth example scattering element group 607, the centerpoint (centroid) 1003 of the scattering element 102-L2S4 in the secondary layer 207 and the centerpoint (centroid) 1001 of the corresponding scattering element 102-L1S4 in the primary layer 205 are co-located at a substantially same position in the y-direction, where the y-direction is perpendicular to the plane of symmetry 111 and parallel to the plane of the chip. In some embodiments, the centerpoint (centroid) 1001 of the scattering element 102-L1S4 of the fourth example scattering element group 607 is located in the primary layer 205 at a gridpoint of the grid 401 as shown in FIG. 4B.

A phase-matching directionality mechanism is provided by the offset of scattering elements 102-L1S1 and 102-L2S1 within scattering element group 601, and the offset of scattering elements 102-L1S2 and 102-L2S2 within scattering element group 603, and the offset of scattering elements 102-L1S3 and 102-L2S3 within scattering element group 605, and the offset of scattering elements 102-L1S4 and 102-L2S4 within scattering element group 607. It should be appreciated that the phase-matching directionality mechanism discussed herein is intrinsic to the configuration of the primary layer 205 and the secondary layer 207, and does not require a complex substrate or incorporation of additional reflecting layers. Therefore, the vertical grating coupler 100 disclosed herein does not require reflecting layers to achieve low light loss. Unlike the vertical grating coupler 100 disclosed herein, other previous grating designs have attempted to achieve low light loss by employing one or more reflecting layers, including a multi-layer substrate designed to reflect light "upward" (away from the wafer substrate), which causes challenges with regard to fabrication cost and incompatibility with standard CMOS fabrication processes. These challenges are obviated by the vertical grating coupler 100 disclosed herein.

Figure 11:
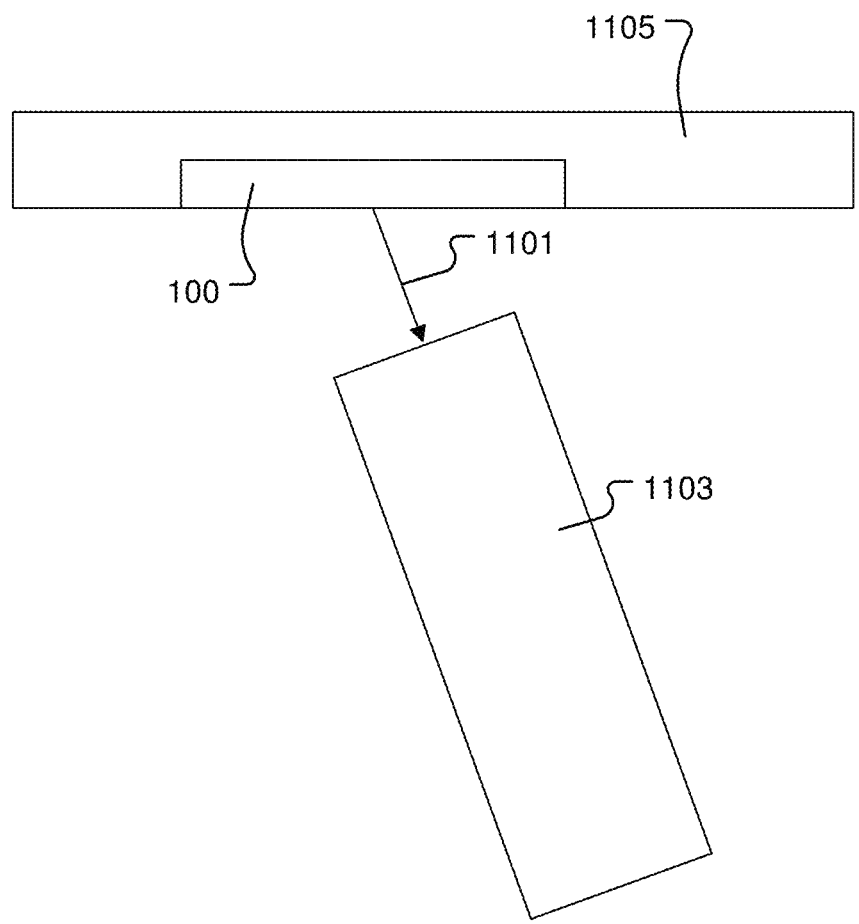
FIG. 11 shows a side view of the vertical grating coupler implemented within a chip to optically couple an off-chip light beam into an optical fiber, in accordance with some embodiments.

FIG. 11 shows a side view of the vertical grating coupler 100 implemented within a chip 1105 to optically couple an off-chip light beam 1101 into an optical fiber 1103, in accordance with some embodiments. The vertical grating coupler 100 scatters light from the first optical waveguide 103 and the second optical waveguide 107 into the off-chip light beam 1101. In some embodiments, the off-chip light beam 1101 is the fundamental mode of the optical fiber 1103. In some embodiments, the off-chip light beam 1101 is approximated as a gaussian beam.

Figure 12:
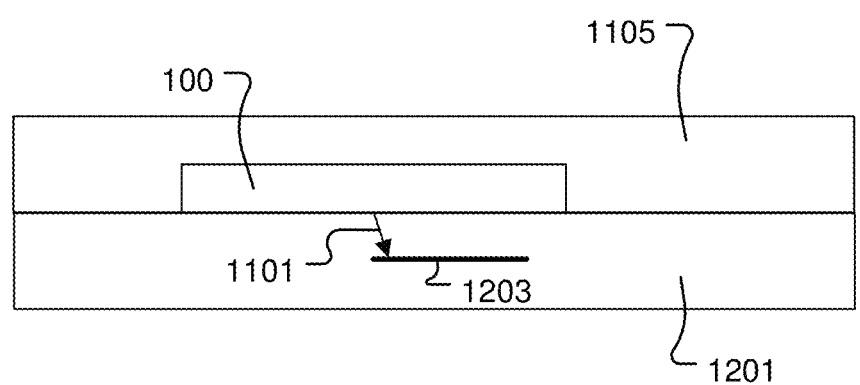
FIG. 12 shows a side view of the vertical grating coupler implemented within the chip to optically couple the off-chip light beam into an optical waveguide, in accordance with some embodiments.

FIG. 12 shows a side view of the vertical grating coupler 100 implemented within the chip 1105 to optically couple the off-chip light beam 1101 into an optical waveguide 1203, in accordance with some embodiments. In some embodiments, the optical waveguide 1203 is implemented within a planar lightwave circuit 1201. In some embodiments, the chip 1105 is attached to the planar lightwave circuit 1201.

Figure 13:
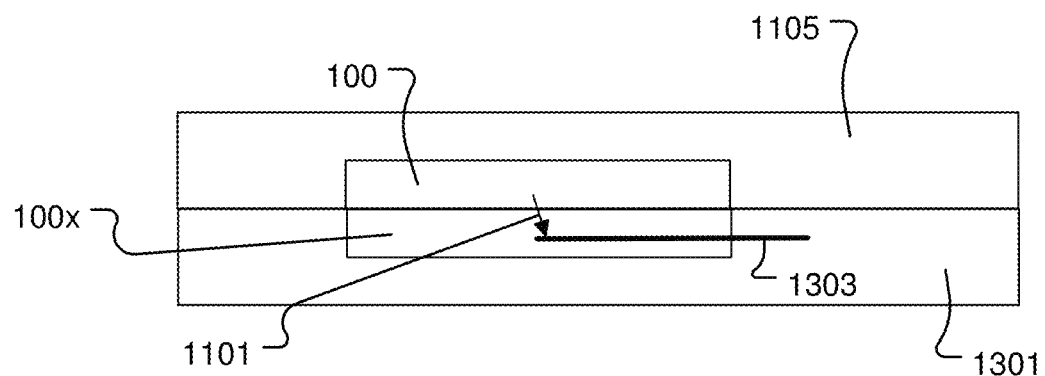
FIG. 13 shows a side view of the vertical grating coupler within the chip to optically couple the off-chip light beam into another vertical grating coupler, in accordance with some embodiments.

FIG. 13 shows a side view of the vertical grating coupler 100 within the chip 1105 to optically couple the off-chip light beam 1101 into another vertical grating coupler 100$x$, in accordance with some embodiments. In some embodiments, the other vertical grating coupler 100$x$ is implemented within another chip 1301. In some embodiments, the chip 1105 is attached to the other chip 1301. The other vertical grating coupler 100$x$ is implemented to direct light from the light beam 1101 into one or more optical waveguide(s) 1303 formed within the other chip 1301.

Figure 14:
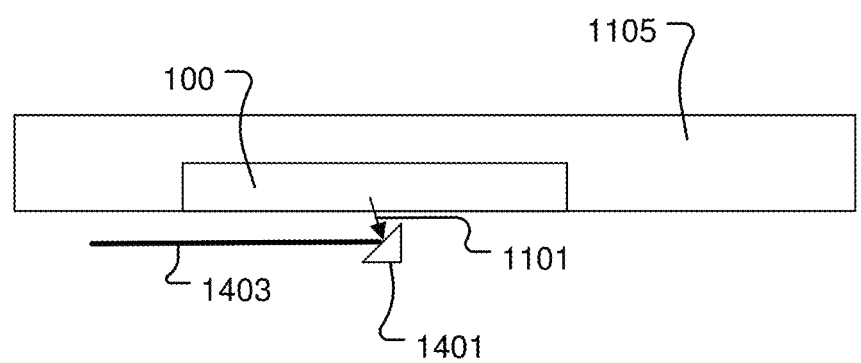
FIG. 14 shows a side view of the vertical grating coupler implemented within the chip to direct the off-chip light beam toward a beam-turning device/assembly, in accordance with some embodiments.

FIG. 14 shows a side view of the vertical grating coupler 100 implemented within the chip 1105 to direct the off-chip light beam 1101 toward a beam-turning device/assembly 1401, in accordance with some embodiments. In some embodiments, the beam-turning device/assembly 1401 is an angled reflector. In some embodiments, the beam-turning device/assembly 1401 is implemented to redirects the light beam 1101 into an optical waveguide 1403, in accordance with some embodiments. In some embodiments, the optical waveguide 1403 is an optical fiber. In some embodiments, the optical waveguide 1403 is formed within a planar lightwave circuit or other chip.

In some embodiments, the vertical grating coupler 100 includes some scattering elements 102 that are not part of a scattering element group. Also, in some embodiments, the vertical grating coupler 102 includes some scattering elements 102 that are positioned with a non-phase-matched offset distance and/or direction relative to another scattering element 102 within a scattering element group, where the non-phase-matched offset distance and/or direction is different (possibly substantially different) from that indicated by a light phase-matching condition for directionality of the off-chip light beam. For example, FIGS. 6, 7A, and 7B show that the scattering element 102-L1S1 in the primary layer 205 and the scattering element 102-L2S1 in the secondary layer 207 (within a given instance of the scattering element group 601 in section S1 closest to the two optical waveguide tapers 105 and 109) have a very small offset 705 (nearly zero) in the x-direction with respect to each other, and have essentially zero offset in the y-direction with respect to each other. This very small offset in the x-direction between the scattering element 102-L1S1 in the primary layer 205 and the scattering element 102-L2S1 in the secondary layer 207 within a given instance of the scattering element group 601 in section S1 closest to the two optical waveguide tapers 105 and 109 improves the apodization by lowering a total amount of light scattering from the section S1 of the vertical grating coupler 100.

In some embodiments, placement of scattering elements 102 so that their respective centerpoints (centroids) fall on a regular array (such as the grid 401 of FIG. 4B, by way of example) within at least one vertical layer (within the primary layer 205, the secondary layer 207, or any other higher level layer) provides a number of advantages compared to scattering element 102 placement patterns that are not in an array configuration or that have a substantially distorted and/or curved array configuration. In some embodiments, placement of scattering elements 102 so that their respective centerpoints (centroids) fall on a regular array (such as the grid 401 of FIG. 4B, by way of example) within at least one vertical layer (within the primary layer 205, the secondary layer 207, or any other higher level layer) provides for good light phase-matching between the flat phase-fronts and the off-chip light beam. Also, having a regular pattern of scattering elements 102 within a given layer, such as by placement of scattering elements 102 so that their respective centerpoints (centroids) fall on a regular array, can beneficially reduce the complexity of chip design, such as when the impact of process variation needs to be inferred from device measurements, by way of example. Also, with the scattering elements 102 disposed in a regular pattern in a given layer, each scattering element 102 has a known nearest-neighbor distance in all directions (at all locations around the scattering element 102), so that no scattering element 102 causes a non-compliance problem with regard to design rule and/or fabrication process constraints. In some embodiments, the scattering elements 102 within a given layer are disposed in a regular pattern such that a given scattering element 102 has essentially the same nearest-neighbor distance at all locations, so that no scattering element 102 causes an adverse impact with regard to design-rule and/or fabrication process constraints, such as with regard to minimum separation between scattering elements 102, by way of example.

In some embodiments, the shape of individual scattering elements 102 is selected to maximize the worst-case transmission of light over any superposition of fields from the two optical waveguide modes of the optical waveguide tapers 105 and 109 into the off-chip light beam. In some embodiments, the relative phases and intensities of the input light beams from the two optical waveguide tapers 105 and 109 respectively map onto polarization, and the worst-case transmission of light is across the relative phase and relative intensity as well as wavelength. The worst-case transmission of light as mentioned herein is understood as the transmission of light for the worst relative phase and ratio of power between the fields of the two input optical waveguides, e.g., of the two optical waveguide tapers 105 and 109.

In some embodiments, the various scattering elements 102 within the vertical grating coupler 100 have shapes such as shown by the scattering elements 102-L1S1 and 102-L2S1 in the scattering element group 601 (see FIGS. 7A and 7B), and such as shown by the scattering elements 102-L1S2 and 102-L2S2 in the scattering element group 603 (see FIGS. 8A and 8B), and such as shown by the scattering elements 102-L1S3 and 102-L2S3 in the scattering element group 605 (see FIGS. 9A and 9B), and such as shown by the scattering elements 102-L1 S4 and 102-L2S4 in the scattering element group 607 (see FIGS. 10A and 10B). However, in other embodiments, any of the scattering elements 102 in the vertical grating coupler 100 (in any layer (primary layer 205, secondary layer 207, or other additional higher level layer) and/or in any section (S1, S2, S3, S4, or any other section) of any layer) can have a size and shape that is customized to provide a prescribed light scattering effect.

Figure 15A:
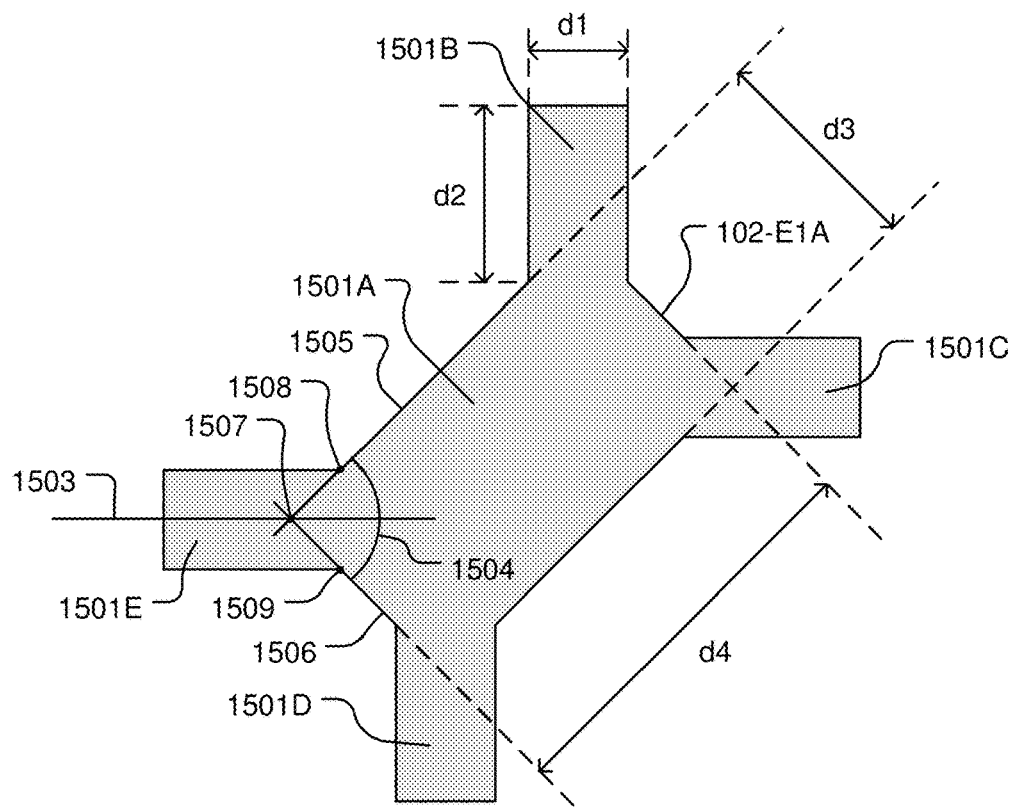
FIG. 15A shows a top view of an example scattering element as drawn in layout, in accordance with some embodiments.

FIG. 15A shows a top view of an example scattering element 102-E1A as drawn in layout, in accordance with some embodiments. The example scattering element 102-E1A includes a body section 1501A having a substantially rectangular shape defined by a width dimension d3 and a length dimension d4. The example scattering element 102-E1A also includes corner sections 1501B, 1501C, 1501D, and 1501E that project outward from respective corners of the body section 1501A. In the example of FIG. 15A, each of the corner sections 1501B, 1501C, 1501D, 1501E has a substantially rectangular shape defined by a width dimension d1 and a length dimension d2. The length dimension d2 is referred to as a "corner emphasis" parameter/dimension. The scattering element 102-E1A is configured as a union of the rectangular-shaped body section 1501A and each of the rectangular-shaped corner sections 1501B, 1501C, 1501D, 1501E, where the lengthwise centerline of each rectangular-shaped corner section 1501B, 1501C, 1501D, 1501E bisects the ninety degree angle between the adjacent sides of the rectangular-shaped body section 1501A that meet at the vertex (corner) of the rectangular-shaped body section 1501A from which the corner section 1501B, 1501C, 1501D, 1501E projects outward from the body section 1501A. For example, the corner section 1501E has a lengthwise centerline 1503 that bisects the ninety degree angle 1504 between the adjacent sides 1505 and 1506 of the body section 1501A that meet at the vertex (corner) 1507 of the body section 1501A from which the corner section 1501E projects outward from the body section 1501A. Also, in some embodiments, the scattering element 102-E1A is configured such that each rectangular-shaped corner section 1501B, 1501C, 1501D, 1501E (as drawn in layout) has two adjacent vertices coincident with adjacent sides of the body section 1501A. For example, the corner section 1501E has two adjacent vertices 1508 and 1509 coincident with the adjacent sides 1505 and 1506, respectively, of the body section 1501A.

It should be understood that the as-fabricated shape of a scattering element 102 can differ from the corresponding layout-drawn shape of the scattering element 102 due to fabrication processes and/or limitations. Therefore, scattering element 102 shapes drawn in layout may differ from scattering element 102 shapes that occur in actual devices.

Figure 15B:
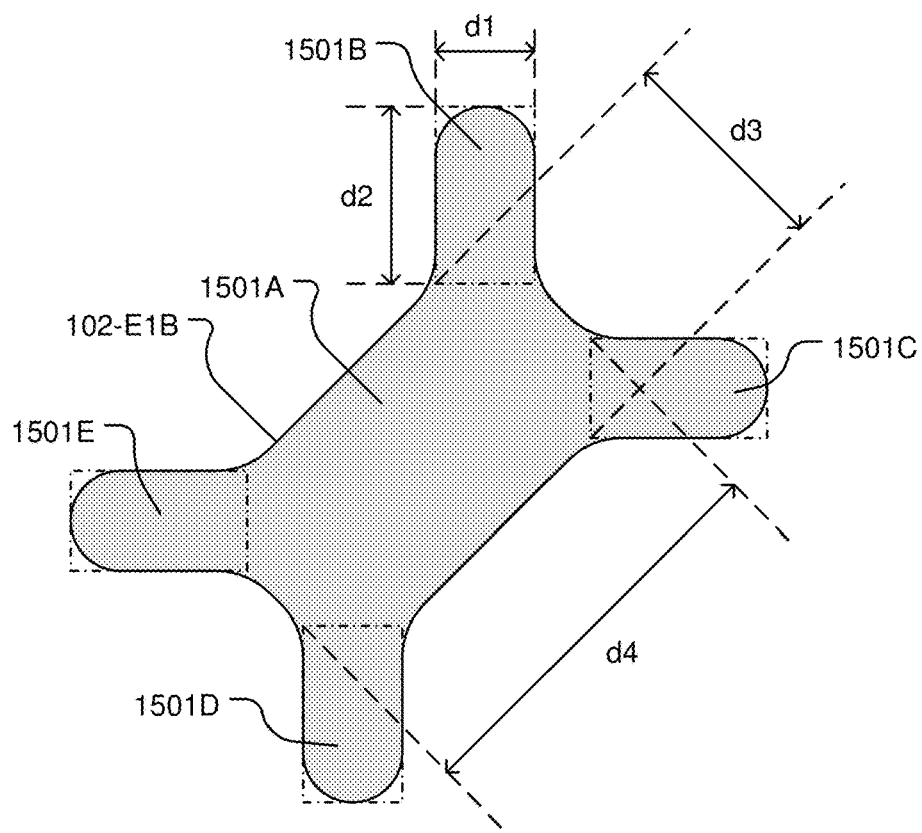
FIG. 15B shows a top view of an as-fabricated scattering element corresponding to the example scattering element drawn in layout in FIG. 15A, in accordance with some embodiments.

For example, FIG. 15B shows a top view of an as-fabricated scattering element 102-E1B corresponding to the example scattering element 102-E1A drawn in layout in FIG. 15A, in accordance with some embodiments. FIG. 15B shows that the as-fabricated scattering element 102-E1B has corner rounding effects due to fabrication processes and/or limitations. Specifically, the convex corners of the scattering element 102-E1B (corresponding to the outer corners of the rectangular-shaped corner section 1501B, 1501C, 1501D, 1501E) are rounded to an extent, and the concave corners of the scattering element 102-E1B (corresponding to the interfaces between the rectangular-shaped corner sections 1501B, 1501C, 1501D, 1501E and the body section 1501A) are rounded to an extent. In some embodiments, scattering elements 102-E1A/102-E1B that have a smaller dimension d2 are characterized as being more "round" than scattering elements 102-E1A/E1B that have a larger dimension d2. The example scattering elements 102-E1A/102-E1B also demonstrate how a scattering element 102 can be elongated along a given direction (along the lengthwise direction of the body section 1501A corresponding to the dimension d4). In this manner, in some embodiments, individual scattering elements 102 are elongated along one direction in order to maximize the worst-case light transmission over any superposition of fields from the two optical waveguide modes of the optical waveguide tapers 105 and 109 into the off-chip light beam. In some embodiments, implementation of such elongated scattering elements 102 within the vertical grating coupler 100 provides for improved apodization (matching between scattered light and the off-chip light beam profile) by reducing or increasing light scattering strength at specified locations within the vertical grating coupler 100.

In some embodiments, scattering element 102 shapes that are drawn in layout are subject to design rules imposed by a fabrication process and/or fabrication facility (foundry). For example, in some embodiments, the layout-drawn scattering element 1501A of FIG. 15A has to satisfy a design rule that requires the dimension d1 to be greater than a specified minimum size (width). In some embodiments, the scattering element 1501A is defined to have the dimension d1 be greater than about 100 nanometers in order to improve compatibility with standard data-preparation and fabrication process flows. However, in some embodiments, the scattering element 1501A is defined to have the dimension d1 be greater than about 70 nanometers. In some embodiments, if the scattering element 102-E1A/102-E1B has a small total area and a large corner emphasis dimension d2, then a minimum-spacing design rule and/or fabrication process constraint may direct an adjustment of the scattering element 102-E1A/102-E1B shape and/or size. For example, in some embodiments, due to design rule and/or fabrication process constraints, scattering elements 102-E1A/102-E1B having smaller total area are configured to have a smaller corner emphasis dimension d2 so as to be more round-shaped, and scattering elements 102-E1A/102-E1B having larger total area are configured to have a larger corner emphasis dimension d2 so as to be more spike-shaped. In some embodiments, scattering elements 102-E1A/102-E1B positioned near the input optical waveguide tapers 105 and 109 are configured to have the smallest total area and the smallest corner emphasis dimension d2 of the scattering elements 102 within the vertical grating coupler 100. In some embodiments, the smallest scattering elements 102-E1A/102-E1B positioned near the input optical waveguide tapers 105 and 109 are configured to have corner emphasis dimension d2 near zero.

It should be understood that in various embodiments, a scattering element 102 (such as scattering elements 102-L1S1, 102-L2S1, 102-L1S2, 102-L2S2, 102-L1S3, 102-L2S3, 102-L1S4, 102-L2S4, 102-E1A/102-E1B) within the vertical grating coupler 100 can be a high refractive index scattering element 102 (such as silicon or material with similar optical properties) within an otherwise low refractive index layer (such as an oxide material, e.g., silicon dioxide, among others). Alternatively, in various embodiments, a scattering element 102 (such as scattering elements 102-L1S1, 102-L2S1, 102-L1S2, 102-L2S2, 102-L1S3, 102-L2S3, 102-L1S4, 102-L2S4, 102-E1A/102-E1B) within the vertical grating coupler 100 can be a low refractive index scattering element 102 (such as an oxide material, e.g., silicon dioxide, among others) within an otherwise high refractive index layer (such as silicon or other material with similar optical properties). Also, in various embodiments, a scattering element 102 (such as scattering elements 102-L1S1, 102-L2S1, 102-L1S2, 102-L2S2, 102-L1S3, 102-L2S3, 102-L1S4, 102-L2S4, 102-E1A/102-E1B) within the vertical grating coupler 100 can be formed as a empty/open region/volume (such as an air filled space) within an otherwise high refractive index layer (such as silicon or other material with similar optical properties). In this manner, the scattering element 102 (such as scattering elements 102-L1S1, 102-L2S1, 102-L1S2, 102-L2S2, 102-L1S3, 102-L2S3, 102-L1S4, 102-L2S4, 102-E1A/102-E1B) within the vertical grating coupler 100 can be formed by the absence of a high refractive index material in a layer otherwise formed by the high refractive index material.

Also, while the example vertical grating coupler 100 has been described as having scattering elements 102 formed within two light scattering layers (within the primary layer 205 and the secondary layer 207), it should be understood that in other embodiments the vertical grating coupler 100 can include scattering elements 102 formed in more than two light scattering layers. For example, another embodiment of the vertical grating coupler 100 can include scattering elements 102 formed within three or more layers, with a more complicated light directionality (phase-matching) condition than that of two layer vertical grating coupler 100, such as described by way of example herein. In some embodiments, the vertical grating coupler 100 is extended vertically to include the primary layer 205, the secondary layer 207, and a tertiary layer formed above the secondary layer 207. An example embodiment of the three-scattering layer vertical grating coupler 100 includes the primary layer 205 formed as a layer of body silicon (such as crystalline silicon), with scattering elements 102 formed within the primary layer 205 by either a partial etching of regions vertically through the primary layer 205 or a full etching of regions vertically through the primary layer 205, and by an optional filling of the etched regions within the primary layer 205 with a material having a refractive index sufficiently different than the body silicon. Also, the example embodiment of the three-scattering layer vertical grating coupler 100 includes the secondary layer 207 formed as a layer of polysilicon above the body silicon of the primary layer 205, with the scattering elements 102 formed within the secondary layer 207 by a full etching of regions vertically through the secondary layer 205, and by an optional filling of the etched regions within the secondary layer 207 with a material having a refractive index sufficiently different than the polysilicon. Also, the example embodiment of the three-scattering layer vertical grating coupler 100 includes the tertiary layer formed as a layer of nitride material (such as silicon nitride, among others) above the polysilicon of the secondary layer 207, with the scattering elements 102 formed within the tertiary layer by a full etching of regions vertically through the tertiary layer, and by an optional filling of the etched regions within the tertiary layer with a material having a refractive index sufficiently different than the nitride material.

In various embodiments, the vertical grating coupler 100 and variations thereof as described herein are compatible with CMOS fabrication processes and can be integrated within high-volume semiconductor device/chip production. Therefore, the vertical grating coupler 100 and variations thereof as described herein are suitable for implementation within semiconductor chips/devices and/or other types of devices that are fabricated using standard CMOS fabrication processes.

In accordance with the foregoing, in some embodiments, the optical grating coupler 100 includes the primary layer 205 formed of a material that has a first refractive index. The optical grating coupler 100 also includes the first plurality of scattering elements 102A, 102B, etc., formed within the primary layer 205. The first plurality of scattering elements 102A, 102B, etc., has a second refractive index that is different than the first refractive index. The optical grating coupler 100 also includes the secondary layer 207 formed over the primary layer 205. The secondary layer 207 is formed of a material having a third refractive index. The optical grating coupler 100 also includes the second plurality of scattering elements 102C, 102D, etc., formed within the secondary layer 207. The second plurality of scattering elements 102C, 102D, etc., has a fourth refractive index that is different than the third refractive index. The fourth refractive index is also different than the second refractive index. At least some of the second plurality of scattering elements 102C, 102D, etc., at least partially overlap corresponding ones of the first plurality of scattering elements 102A, 102B, etc. In some embodiments, the first refractive index is greater than the second refractive index, and the third refractive index is less than the fourth refractive index. In some embodiments, the first refractive index is less than the second refractive index, and the third refractive index is greater than the fourth refractive index.

In some embodiments, the first plurality of scattering elements 102A, 102B, etc., are positioned symmetrically on each side of the vertical plane of symmetry 111 that bisects the optical grating coupler 100, and the second plurality of scattering elements 102C, 102D, etc., are positioned symmetrically on each side of the vertical plane of symmetry 111. The first plurality of scattering elements 102A, 102B, etc., and the second plurality of scattering elements 102C, 102D, etc., are collectively formed and positioned to scatter both a first incoming light beam and a second incoming light beam into an off-chip beam of light. The first incoming light beam is received through the first lateral side 100A of the optical grating coupler 100. The second incoming light beam is received through the second lateral side 100B of the optical grating coupler 100. The first lateral side 100A and the second lateral side 100B of the optical grating coupler 100 are adjacent sides along an outer perimeter of the optical grating coupler 100. The first lateral side 100A of the optical grating coupler 100 is on a first side of the vertical plane of symmetry 111. The second lateral side 100B of the optical grating coupler 100 is on a second side of the vertical plane of symmetry 111.

In some embodiments, the first lateral side 100A of the optical grating coupler 100 is optically coupled to the first optical waveguide taper 105. The first incoming light beam is received through the first optical waveguide taper 105.

Also, the second lateral side 100B of the optical grating coupler 100 is optically coupled to the second optical waveguide taper 109. The second incoming light beam is received through the second optical waveguide taper 109.

In some embodiments, the first plurality of scattering elements 102A, 102B, etc., and the second plurality of scattering elements 102C, 102D, etc., are arranged to include the first section S1 of scattering element groups 601 positioned along the first lateral side 100A and the second lateral side 100B of the optical grating coupler 100. Also, the first plurality of scattering elements 102A, 102B, etc., and the second plurality of scattering elements 102C, 102D, etc., are arranged to include the second section S2 of scattering element groups 603 positioned behind the first section S1 of scattering element groups 601 in a direction away from the first lateral side 100A and the second lateral side 100B of the optical grating coupler 100. Also, the first plurality of scattering elements 102A, 102B, etc., and the second plurality of scattering elements 102C, 102D, etc., are arranged to include the third section S3 of scattering element groups 605 positioned behind the second section S2 of scattering element groups 603 in the direction away from the first lateral side 100A and the second lateral side 100B of the optical grating coupler 100. Also, the first plurality of scattering elements 102A, 102B, etc., and the second plurality of scattering elements 102C, 102D, etc., are arranged to include the fourth section S4 of scattering element groups 607 positioned behind the third section S3 of scattering element groups 605 in the direction away from the first lateral side 100A and the second lateral side 100B of the optical grating coupler 100.

Each scattering element group 601, 603, 605, 607 is a pair of scattering elements 102 that includes a corresponding scattering element 102 of the first plurality of scattering elements 102A, 102B, etc., and a corresponding scattering element 102 of the second plurality of scattering elements 102C, 102D, etc. In some embodiments, the scattering elements 102-L1S2 of the first plurality of scattering elements 102A, 102B, etc., in the second section S2 of scattering element groups 603 are larger than the scattering elements 102-L1S1 of the first plurality of scattering elements 102A, 102B, etc., in the first section S1 of scattering element groups 601. And, the scattering elements 102-L2S2 of the second plurality of scattering elements 102C, 102D, etc., in the second section S2 of scattering element groups 603 are larger than the scattering elements 102-L2S1 of the second plurality of scattering elements 102C, 102D, etc., in the first section S1 of scattering element groups 601.

In some embodiments, the scattering elements 102-L1S3 of the first plurality of scattering elements 102A, 102B, etc., in the third section S3 of scattering element groups 605 are larger than the scattering elements 102-L1S2 of the first plurality of scattering elements 102A, 102B, etc., in the second section S2 of scattering element groups 603. And, the scattering elements 102-L2S3 of the second plurality of scattering elements 102C, 102D, etc., in the third section S3 of scattering element groups 605 are larger than the scattering elements 102-L2S2 of the second plurality of scattering elements 102C, 102D, etc., in the second section S2 of scattering element groups 603.

In some embodiments, the scattering elements 102-L1S4 of the first plurality of scattering elements 102A, 102B, etc., in the fourth section S4 of scattering element groups 607 are larger than the scattering elements 102-L1S3 of the first plurality of scattering elements 102A, 102B, etc., in the third section S3 of scattering element groups 605. And, the scattering elements 102-L2S4 of the second plurality of scattering elements 102C, 102D, etc., in the fourth section S4 of scattering element groups 607 are larger than the scattering elements 102-L2S3 of the second plurality of scattering elements 102C, 102D, etc., in the third section S3 of scattering element groups 605.

In some embodiments, some of the second plurality of scattering elements 102C, 102D, etc., are positioned to have a lateral offset 705, 805, 905, 1005 with respect to corresponding overlapped ones of the first plurality of scattering elements 102A, 102B, etc., in a direction parallel to the vertical plane of symmetry 111. In some embodiments, the lateral offset 705, 805, 905, 1005 is defined to control the angle 214 of the off-chip beam of light (represented by arrows 213) as measured relative to the vector 212 that extends perpendicular to the primary layer 205. Additionally, in some embodiments, the first plurality of scattering elements 102A, 102B, etc., are positioned on respective gridpoints of the grid 401.

Figure 16:
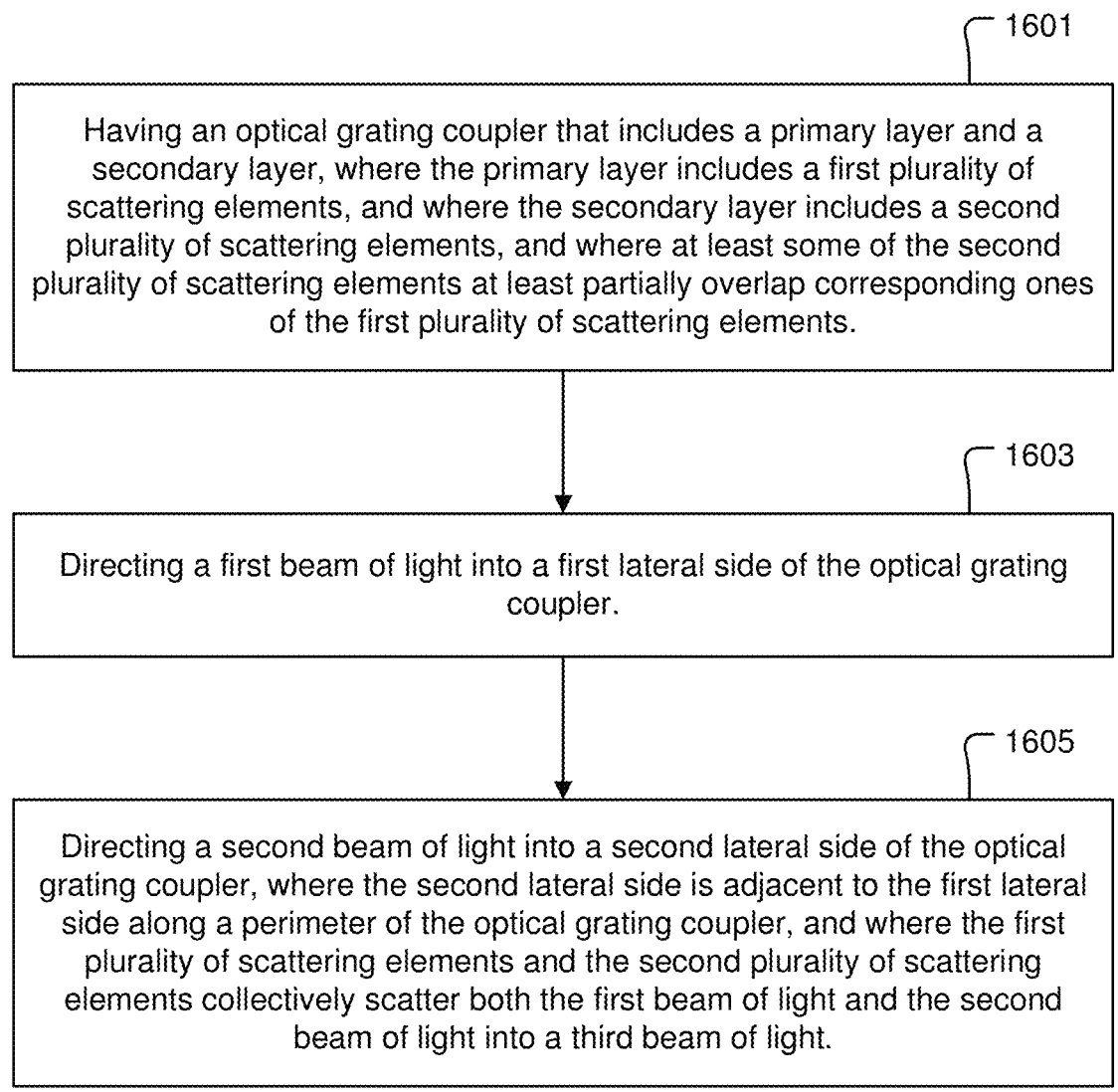
FIG. 16 shows a flowchart of a method for combining light beams, in accordance with some embodiments.

FIG. 16 shows a flowchart of a method for combining light beams, in accordance with some embodiments. The method includes an operation 1601 for having an optical grating coupler (100) that includes a primary layer (205) and a secondary layer (207), where the primary layer (205) includes a first plurality of scattering elements (102A, 102B, etc.), and where the secondary layer (207) includes a second plurality of scattering elements (102C, 102D, etc.), and where at least some of the second plurality of scattering elements (102C, 102D, etc.) at least partially overlap corresponding ones of the first plurality of scattering elements (102A, 102B, etc.). The method also includes an operation 1603 for directing a first beam of light into a first lateral side (100A) of the optical grating coupler (100). The method also includes an operation 1605 for directing a second beam of light into a second lateral side (100B) of the optical grating coupler (100), where the second lateral side (100B) is adjacent to the first lateral side (100A) along a perimeter of the optical grating coupler (100). The first plurality of scattering elements (102A, 102B, etc.) and the second plurality of scattering elements (102C, 102D, etc.) collectively scatter both the first beam of light and the second beam of light into a third beam of light. In some embodiments, the first beam of light has a first polarization and the second beam of light has a second polarization different than the first polarization. In these embodiments, the third beam of light includes both light of the first polarization from the first beam of light and light of the second polarization from the second beam of light.

In some embodiments, the first plurality of scattering elements (102A, 102B, etc.) and the second plurality of scattering elements (102C, 102D, etc.) are configured to implement apodization of light scattering strength along propagations directions of the first beam of light and the second beam of light. In some embodiments, the third beam of light is transmitted out of the optical grating coupler (100) in a non-coplanar direction (213) with respect to a plane of the optical grating coupler (100). In some embodiments, the first plurality of scattering elements (102A, 102B, etc.) are positioned symmetrically on each side of a vertical plane of symmetry (111) that bisects the optical grating coupler (100), and the second plurality of scattering elements (102C, 102D etc.) are positioned symmetrically on each side of the vertical plane of symmetry (111). In these embodiments, the third beam of light is transmitted within the vertical plane of symmetry (111).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the invention description. Accordingly, the present embodiments are to be considered as illustrative and not restrictive, and the invention is not to be limited to the details given herein, but may be modified within the scope and equivalents of the described embodiments.

What is claimed is:

1. An optical grating coupler, comprising:
    a primary layer formed of a material having a first refractive index, the primary layer having a top surface;
    a first plurality of scattering elements formed within the primary layer, the first plurality of scattering elements having a second refractive index that is different than the first refractive index, wherein each of the first plurality of scattering elements has a cross-shaped cross-section oriented parallel to the top surface of the primary layer;
    a secondary layer formed over the primary layer, the secondary layer formed of a material having a third refractive index, the secondary layer having a top surface; and
    a second plurality of scattering elements formed within the secondary layer, the second plurality of scattering elements having a fourth refractive index that is different than the third refractive index, wherein the fourth refractive index is different than the second refractive index, wherein each of the second plurality of scattering elements has a cross-shaped cross-section oriented parallel to the top surface of the secondary layer, wherein at least some of the second plurality of scattering elements at least partially overlap corresponding ones of the first plurality of scattering elements.

2. The optical grating coupler as recited in claim 1, wherein the first plurality of scattering elements are positioned symmetrically on each side of a vertical plane of symmetry that bisects the optical grating coupler, and wherein the second plurality of scattering elements are positioned symmetrically on each side of the vertical plane of symmetry.

3. The optical grating coupler as recited in claim 2, wherein the first plurality of scattering elements and the second plurality of scattering elements are collectively formed and positioned to scatter both a first incoming light beam and a second incoming light beam into an off-chip beam of light.

4. The optical grating coupler as recited in claim 3, wherein the first incoming light beam is received through a first lateral side of the optical grating coupler, wherein the second incoming light beam is received through a second lateral side of the optical grating coupler, wherein the first and second lateral sides of the optical grating coupler are adjacent sides along an outer perimeter of the optical grating coupler, wherein the first lateral side of the optical grating coupler is on a first side of the vertical plane of symmetry, and wherein the second lateral side of the optical grating coupler is on a second side of the vertical plane of symmetry.

5. The optical grating coupler as recited in claim 4, wherein the first lateral side of the optical grating coupler is optically coupled to a first optical waveguide taper, the first incoming light beam received through the first optical waveguide taper, and wherein the second lateral side of the optical grating coupler is optically coupled to a second optical waveguide taper, the second incoming light beam received through the second optical waveguide taper.

6. The optical grating coupler as recited in claim 4, wherein the first and second pluralities of scattering elements are arranged to include a first section of scattering element groups positioned along the first and second lateral sides of the optical grating coupler, wherein the first and second pluralities of scattering elements are arranged to include a second section of scattering element groups positioned behind the first section of scattering element groups in a direction away from the first and second lateral sides of the optical grating coupler, wherein the first and second pluralities of scattering elements are arranged to include a third section of scattering element groups positioned behind the second section of scattering element groups in the direction away from the first and second lateral sides of the optical grating coupler, wherein the first and second pluralities of scattering elements are arranged to include a fourth section of scattering element groups positioned behind the third section of scattering element groups in the direction away from the first and second lateral sides of the optical grating coupler.

7. The optical grating coupler as recited in claim 6, wherein each scattering element group is a pair of scattering elements that includes a corresponding scattering element of the first plurality of scattering elements and a corresponding scattering element of the second plurality of scattering elements.

8. The optical grating coupler as recited in claim 6, wherein the scattering elements of the first plurality of scattering elements in the second section of scattering element groups are larger than the scattering elements of the first plurality of scattering elements in the first section of scattering element groups, and wherein the scattering elements of the second plurality of scattering elements in the second section of scattering element groups are larger than the scattering elements of the second plurality of scattering elements in the first section of scattering element groups.

9. The optical grating coupler as recited in claim 8, wherein the scattering elements of the first plurality of scattering elements in the third section of scattering element groups are larger than the scattering elements of the first plurality of scattering elements in the second section of scattering element groups, and wherein the scattering elements of the second plurality of scattering elements in the third section of scattering element groups are larger than the scattering elements of the second plurality of scattering elements in the second section of scattering element groups.

10. The optical grating coupler as recited in claim 9, wherein the scattering elements of the first plurality of scattering elements in the fourth section of scattering element groups are larger than the scattering elements of the first plurality of scattering elements in the third section of scattering element groups, and wherein the scattering elements of the second plurality of scattering elements in the fourth section of scattering element groups are larger than the scattering elements of the second plurality of scattering elements in the third section of scattering element groups.

11. The optical grating coupler as recited in claim 1, wherein the first plurality of scattering elements are positioned on respective gridpoints of a grid.

12. A method for combining light beams, comprising:
having an optical grating coupler that includes a primary layer formed of a material having a first refractive index, the primary layer having a top surface, the optical grating coupler including a first plurality of scattering elements formed within the primary layer, the first plurality of scattering elements having a second refractive index that is different than the first refractive index, wherein each of the first plurality of scattering elements has a cross-shaped cross-section oriented parallel to the top surface of the primary layer, the optical grating coupler including a second layer formed over the primary layer, the second layer formed of a material having a third refractive index, the secondary layer having a top surface, the optical grating coupler including a second plurality of scattering elements formed within the secondary layer, the second plurality of scattering elements having a fourth refractive index that is different than the third refractive index, wherein the fourth refractive index is different than the second refractive index, wherein each of the second plurality of scattering elements has a cross-shaped cross-section oriented parallel to the top surface of the secondary layer, wherein at least some of the second plurality of scattering elements at least partially overlap corresponding ones of the first plurality of scattering elements;
directing a first beam of light into a first lateral side of the optical grating coupler; and
directing a second beam of light into a second lateral side of the optical grating coupler, the second lateral side adjacent to the first lateral side along a perimeter of the optical grating coupler,
wherein the first plurality of scattering elements and the second plurality of scattering elements collectively scatter both the first beam of light and the second beam of light into a third beam of light.

13. The method as recited in claim 12, wherein the first beam of light has a first polarization and the second beam of light has a second polarization different than the first polarization, the third beam of light including both light of the first polarization from the first beam of light and light of the second polarization from the second beam of light.

14. The method as recited in claim 12, wherein the first plurality of scattering elements and the second plurality of scattering elements are configured to implement apodization of light scattering strength along propagations directions of the first beam of light and the second beam of light.

15. The method as recited in claim 14, wherein the third beam of light is transmitted out of the optical grating coupler in a non-coplanar direction with respect to a plane of the optical grating coupler.

16. The method as recited in claim 15, wherein the first plurality of scattering elements are positioned symmetrically on each side of a vertical plane of symmetry that bisects the optical grating coupler, and wherein the second plurality of scattering elements are positioned symmetrically on each side of the vertical plane of symmetry, and wherein the third beam of light is transmitted within the vertical plane of symmetry.

17. The optical grating coupler as recited in claim 7, wherein the first refractive index is greater than the second refractive index, and wherein the third refractive index is less than the fourth refractive index.

18. The optical grating coupler as recited in claim 7, wherein the first refractive index is less than the second refractive index, and wherein the third refractive index is greater than the fourth refractive index.

19. The optical grating coupler as recited in claim 10, wherein some of the second plurality of scattering elements are positioned to have a lateral offset with respect to corresponding overlapped ones of the first plurality of scattering elements in a direction parallel to the vertical plane of symmetry.

20. The optical grating coupler as recited in claim 19, wherein the lateral offset is defined to control an angle of the off-chip beam of light as measured relative to a vector that extends perpendicular to the primary layer.

* * * * *